US012313990B2

(12) United States Patent
Yasumitsu

(10) Patent No.: US 12,313,990 B2
(45) **Date of Patent: *May 27, 2025**

(54) SHEET CONVEYANCE APPARATUS AND IMAGE FORMING SYSTEM

(71) Applicant: CANON KABUSHIKI KAISHA, Tokyo (JP)

(72) Inventor: Takuya Yasumitsu, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/098,221

(22) Filed: Jan. 18, 2023

(65) Prior Publication Data

US 2023/0152735 A1 May 18, 2023

Related U.S. Application Data

(63) Continuation of application No. 17/324,364, filed on May 19, 2021, now Pat. No. 11,579,547.

(30) Foreign Application Priority Data

May 26, 2020 (JP) ................................ 2020-091179
May 26, 2020 (JP) ................................ 2020-091180
Mar. 12, 2021 (JP) ................................ 2021-039766

(51) Int. Cl.
*G03G 15/20* (2006.01)
*B65H 5/36* (2006.01)

(52) U.S. Cl.
CPC ........... *G03G 15/2021* (2013.01); *B65H 5/36* (2013.01)

(58) Field of Classification Search
CPC ........... G03G 15/2021; G03G 21/1623; G03G 21/1633; G03G 21/1638; G03G 21/1695
See application file for complete search history.

(56) References Cited

U.S. PATENT DOCUMENTS

2018/0150021 A1 5/2018 Yamamoto
2020/0122939 A1 4/2020 Barker et al.

FOREIGN PATENT DOCUMENTS

JP S64-9928 U 1/1989
JP H10-77137 A 3/1998
(Continued)

OTHER PUBLICATIONS

Japanese Office Action dated Oct. 8, 2024, in related Japanese Patent Application No. 2021-039766.

*Primary Examiner* — Walter L Lindsay, Jr.
*Assistant Examiner* — Andrew V Do
(74) *Attorney, Agent, or Firm* — VENABLE LLP

(57) ABSTRACT

A sheet conveyance apparatus includes a first guide to guide a conveyed sheet and a second guide to face the first guide and to form a sheet conveyance path together with the first guide, with the second guide being pivotable between a first position in which the sheet conveyance path is formed and a second position in which the sheet conveyance path is opened. A cover is movable between a closed position in which it covers the second guide and an open position in which the second guide is manipulatable, and an abutting portion is provided on the cover to abut the second guide. In a state where the second guide is held at the second position by the holding portion and the cover moves to the closed position from the open position, the abutting portion abuts the second guide to release the second guide held by the holding portion.

23 Claims, 12 Drawing Sheets

(56) References Cited

FOREIGN PATENT DOCUMENTS

| | | | |
|---|---|---|---|
| JP | 2006-064727 | A | 3/2006 |
| JP | 2020-002644 | A | 1/2010 |
| JP | 2016-204142 | A | 12/2016 |

SHEET CONVEYANCE APPARATUS AND IMAGE FORMING SYSTEM

This application is a continuation of application Ser. No. 17/324,364, filed May 19, 2021.

BACKGROUND OF THE INVENTION

Field of the Invention

The present invention relates to a sheet conveyance apparatus and an image forming system including the same.

Description of the Related Art

Hitherto, an image forming apparatus configured to form an image onto a sheet serving as a recording material such as a copier, a printer and a facsimile is provided with a sheet conveyance apparatus configured to convey the sheet. In the image forming apparatus, there is a case where a so-called jam occurs and the sheet stagnates in a sheet conveyance apparatus. To deal with such a case, Japanese Patent Application Laid-open No. 2016-204142 discloses a sheet conveyance apparatus that is provided with a pair of guide plates disposed openably and so as to face each other to nip the sheet to enable a user to remove the sheet stagnating in the sheet conveyance apparatus. Then, one of the guide plates is provided with a jam releasing lever that enables the user to hold and to operate to be able to open a sheet conveyance path by manually operating the lever. That is, the user can operate the jam releasing lever while opening a door openably attached to an apparatus body.

In a case where a jam occurs as described above, the user can remove the sheet stagnated in the sheet conveyance apparatus by moving one of the guide plates to an open position where the sheet conveyance path is opened by opening the door and by operating the jam releasing lever. At this time, the moved guide plate is held at the open position so as not to return to a close position where the sheet conveyance path is not opened during when the user removes the sheet. Therefore, the user is required to close the door after returning the guide plate to the close position after removing the sheet. According to the apparatus disclosed in above-described Japanese Patent Application Laid-open No. 2016-204142, the door is hardly closed in a case where the guide plate is not returned to the close position. However, in a case where the user forgets to return the guide plate to the close position and the door is forcibly closed while keeping the guide plate at the open position, there is a possibility that the guide plate or the like is damaged by being strongly pressed by the door.

SUMMARY OF THE INVENTION

According to one aspect of the present invention, a sheet conveyance apparatus includes a conveyance portion configured to convey a sheet, a first guide plate configured to guide one surface of the sheet being conveyed by the conveyance portion, a second guide plate provided so as to face the first guide plate, the second guide plate being pivotable between a first position in which a sheet conveyance path is formed together with the first guide plate by guiding another surface opposite from one surface of the sheet and a second position by which the sheet conveyance path is opened, an operation portion provided on the second guide plate and configured to be operated for pivoting the second guide plate, a holding portion configured to hold the second guide plate at the second position, a door composing a part of an appearance of the sheet conveyance apparatus, being provided to be pivotable between an open state and a close state and permitting access to the operation portion when the door is opened, a releasing portion provided on the door, configured to abut with the operation portion on the second guide plate positioned at the second position along with a move of the door from the open state to the close state and release the second guide plate held by the holding portion, a pressing portion provided on the door and configured to press the operation portion such that the second guide plate is positioned at the first position, and a retraction portion provided on the door and configured to retract the pressing portion from a moving locus of the operation portion in moving the second guide plate from the first position to the second position by abutting with the operation portion of the second guide plate moving from the second position to the first position and swinging.

Further features of the present invention will become apparent from the following description of exemplary embodiments with reference to the attached drawings.

BRIEF DESCRIPTION OF THE DRAWINGS

FIG. 10B is a schematic diagram illustrating the upstream guide portion in a state in which the front door is closed halfway through.

FIG. 10C is a schematic diagram illustrating the upstream guide portion in a state in which the front door is closed still halfway through.

DESCRIPTION OF THE EMBODIMENTS

Image Forming System

Figure 1:
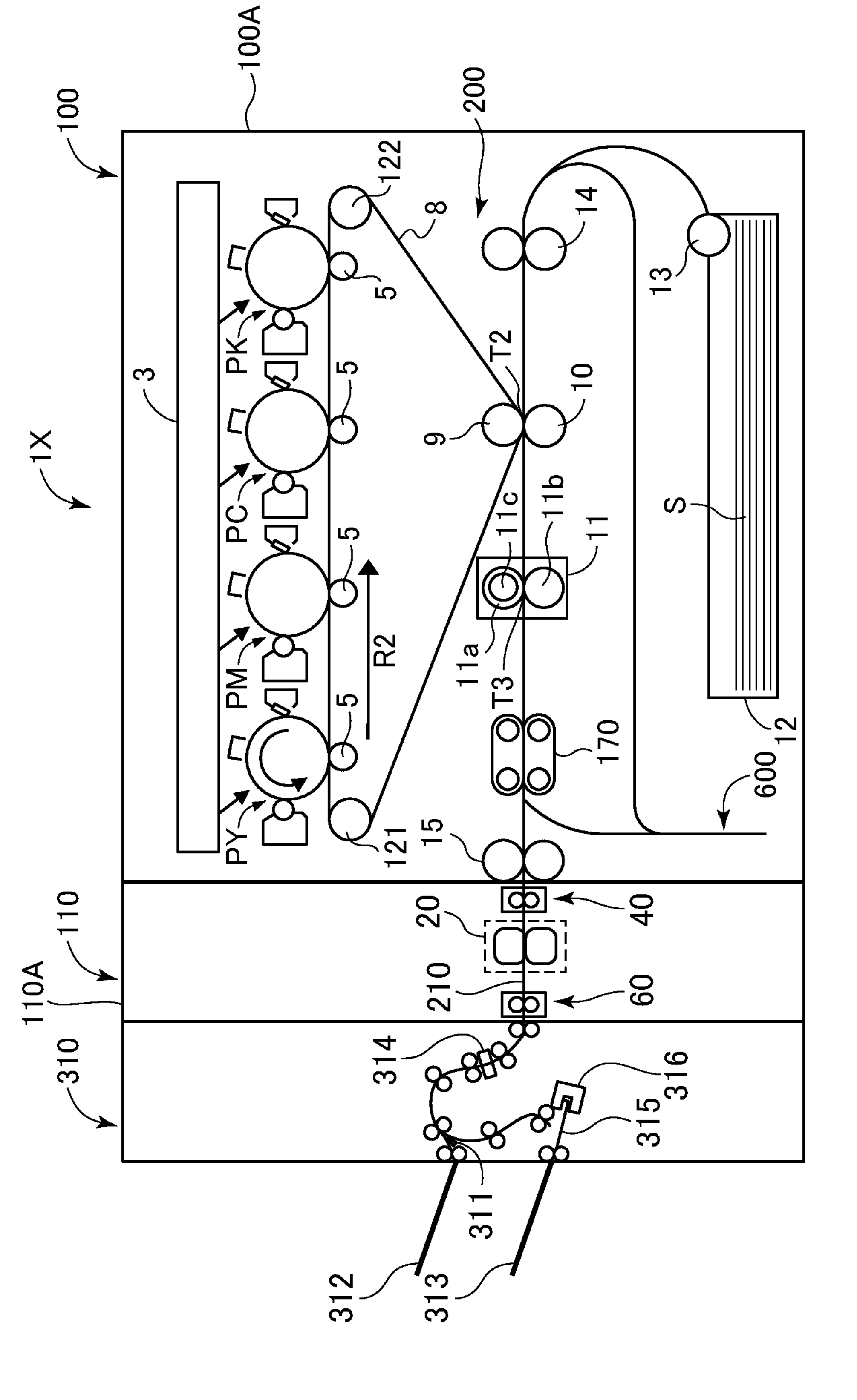
FIG. 1 is a schematic diagram illustrating a configuration of an image forming system according to a present exemplary embodiment.

A configuration of an image forming system of the present exemplary embodiment will be schematically described with reference to FIGS. 1 and 2. The image forming system 1X illustrated in FIG. 1 includes an image forming apparatus 100, an external cooling apparatus 110 and a sheet processing apparatus 310.

Image Forming Apparatus

The image forming apparatus 100 is an electro-photographic tandem type full-color printer. The image forming apparatus 100 includes image forming units PY, PM, PC and PK configured to form yellow, magenta, cyan and black images, respectively. The image forming apparatus 100 is configured to form and fix the toner images onto a sheet S corresponding to image signals transmitted from an image reading apparatus and connected to an apparatus body 100A or from an external unit such as a personal computer communicably connected with the apparatus body 100A. The sheet S includes various sheet members such as a plain sheet of paper, a thick paper, a rough paper, an uneven paper, a coated paper, a plastic film and a cloth. In a case of the present exemplary embodiment, an image forming unit 200 configured to form the toner images onto the sheet S has the image forming units PY, PM, PC and PK, a primary transfer roller 5, an intermediate transfer belt 8, a secondary transfer inner roller 9, a secondary transfer outer roller 10 and tension rollers 121 and 122.

As illustrated in FIG. 1, the image forming units PY, PM, PC and PK are disposed side by side along a moving direction of the intermediate transfer belt 8 within the apparatus body 100A. The intermediate transfer belt 8 is configured to run in a direction of an arrow R2 in FIG. 1 by being stretched by a plurality of rollers. The intermediate transfer belt 8 bears and conveys the toner images transferred from a photosensitive drum 1 (see FIG. 2). The secondary transfer outer roller 10 is disposed at a position facing the secondary transfer inner roller 9 stretching the intermediate transfer belt 8 across the intermediate transfer belt 8 and forms a secondary transfer portion T2 for transferring the toner images on the intermediate transfer belt 8 onto the sheet S.

A cassette 12 storing the sheets S is disposed at an under part of the image forming apparatus 100. The sheet S is conveyed out of the cassette 12 by a conveyance roller 13 to a registration roller 14. Then, the sheet S is conveyed to the secondary transfer portion T2 as the registration roller 14 starts to rotate in synchronism with the toner images formed on the intermediate transfer belt 8 as described later. Note that while one cassette 12 is illustrated here, a plurality of cassettes 12 may be disposed so as to store different sheets S having different sizes and thicknesses. In such a case, the sheet S may be conveyed selectively from any one of the plurality of cassettes 12. Still further, not only the sheet S stored in the cassette 12, the sheet S may be conveyed from a manual feed portion not illustrated or from an external sheet feed unit not illustrated and connected to the apparatus body 100A.

The image forming units PY, PM, PC and PK have substantially the same configuration except that their developing colors are different. Therefore, the image forming unit PK configured to form a black image will be typically described and the other image forming units will not be described here.

Figure 2:
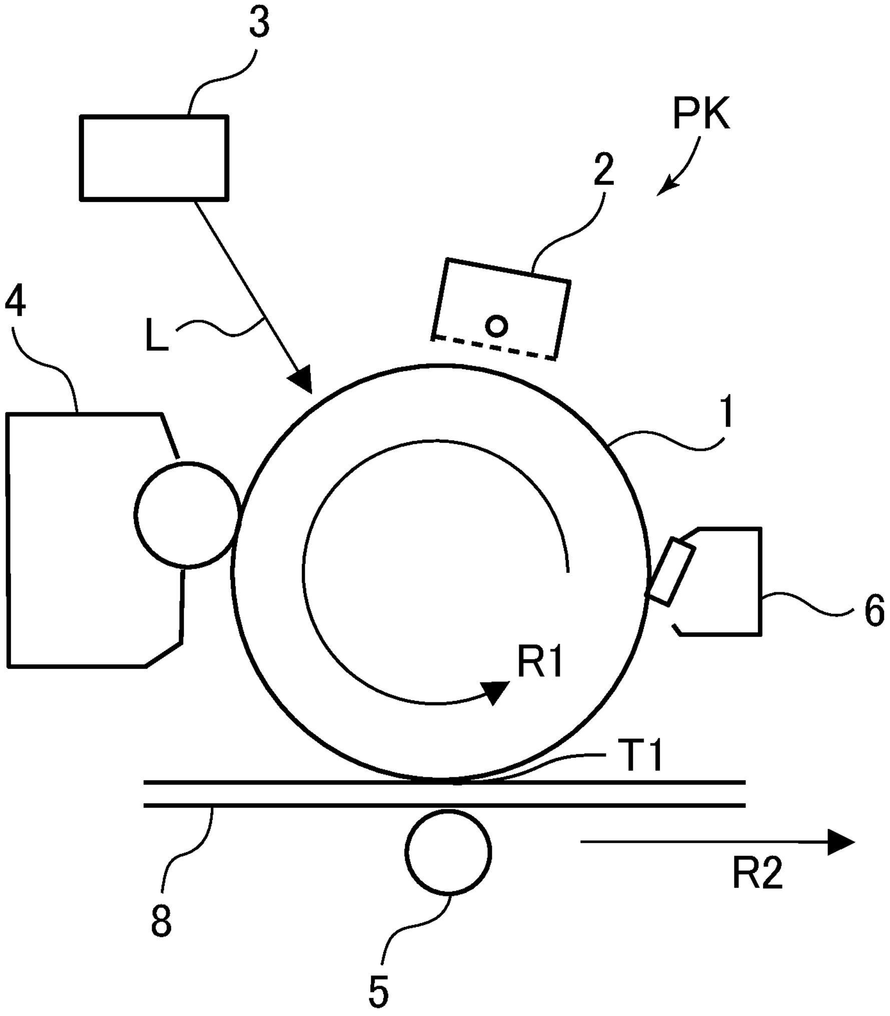
FIG. 2 is a schematic diagram illustrating an image forming unit.

As illustrated in FIG. 2, the cylindrical photosensitive drum 1 serving as a photosensitive member is disposed in the image forming unit PK. The photosensitive drum 1 is rotated in a direction of an arrow R1 at a predetermined processing speed. Disposed around the photosensitive drum 1 are a charging unit 2, an exposure unit 3, a developing unit 4, a primary transfer roller 5 and a cleaning unit 6.

A process for forming a full-color image by the image forming apparatus 100 will now be described. A surface of the photosensitive drum 1 is homogeneously charged by the charging unit 2 when an image forming operation starts. The charging unit 2 is a corona charger for example that irradiates the surface of the photosensitive drum 1 with charged particles generated along corona discharge for example to homogeneously charge the photosensitive drum 1 with a negative dark potential. Next, the photosensitive drum 1 is scanned and exposed by a laser light L corresponding to image signals emitted from the exposure unit 3. Thereby, an electrostatic latent image corresponding to the image signals is formed on the surface of the photosensitive drum 1. The electrostatic latent image formed on the photosensitive drum 1 is then developed and visualized by toner stored within the developing unit 4.

The toner image formed on the photosensitive drum 1 is then transferred onto the intermediate transfer belt 8 at a primary transfer portion T1 configured between the photosensitive drum 1 and the primary transfer roller 5 disposed across the intermediate transfer belt 8. At this time, a primary transfer voltage is applied to the primary transfer roller 5. Toner left on the surface of the photosensitive drum 1 after the primary transfer is removed by the cleaning unit 6.

Returning to the description of FIG. 1, such operation is sequentially conducted in each of the image forming units PY, PM, PC and PK of yellow, magenta, cyan and black, and the four toner images are superimposed on the intermediate transfer belt 8. After that, the sheet S stored in the cassette 12 is conveyed to the secondary transfer portion T2 in synchronism with the toner image forming timing. Then, the full-color toner image formed on the intermediate transfer belt 8 is secondarily and collectively transferred onto the sheet S as a secondary transfer voltage is applied to the secondary transfer outer roller 10.

The sheet S onto which the toner image has been secondarily transferred is conveyed to a fixing unit 11. The fixing unit 11 includes a rotatably disposed fixing roller 11*a* and a pressure roller 11*b* that rotates while being in pressure contact with the fixing roller 11*a*. The fixing roller 11*a* is rotated by a driving motor not illustrated while being in pressure contact with the pressure roller 11*b*. A halogen heater 11*c* is disposed within the fixing roller 11*a* to heat the fixing roller 11*a*.

The fixing unit 11 is configured to fix the toner image onto the sheet S on which the toner image has been formed by heating and pressurizing the sheet S by nipping and conveying at the fixing nip portion T3 by the fixing roller 11*a* and the pressure roller 11*b*. That is, the toner of the toner image formed onto the sheet S is molten and blended by the heat and pressure and is fixed onto the sheet S as the full-color image. The series of image forming process thus ends. Then, the sheet S onto which the toner image has been fixed is conveyed by the conveyance unit 170.

In a case of the present exemplary embodiment, the image forming apparatus 100 can perform duplex printing. In a case of simplex printing, the sheet S onto which the toner image has been fixed is discharged by a sheet discharge roller 15 out of the apparatus body 100A. In a case of the duplex printing, the sheet S onto which the toner image has been fixed is conveyed to a duplex reverse conveyance path 600 to be reversed such that a front surface and a back surface of the sheet S are switched. The reversed sheet S is conveyed to the registration roller 14 and is conveyed toward the secondary transfer portion T2 such that the back surface of the sheet not printed faces the intermediate transfer belt 8. A full-color toner image formed onto the intermediate transfer belt 8 is secondarily and collectively transferred onto the back surface of the sheet S at the secondary transfer portion T2. Then, the toner image of the sheet S is fixed by the fixing unit 11 and the sheet S is discharged out of the apparatus body 100A.

The image forming apparatus 100 is linked with the external cooling apparatus 110 and the sheet processing apparatus 310 so as to be able to pass the sheet S sequentially from an upstream side of a conveyance path of the sheet S. The external cooling apparatus 110 and the sheet processing apparatus 310 are configured to be able to link with the image forming apparatus 100 as retrofitting peripheral apparatuses or optional units for extending functions of the image forming apparatus 100. The image forming apparatus 100, the external cooling apparatus 110 and the sheet processing apparatus 310 are connected among each other so as to be able to transmit/receive data through communication cables not illustrated that allow serial communication or parallel communication. The image forming apparatus 100 controls the external cooling apparatus 110 and the sheet processing apparatus 310 through the communication cables connected so as to be able to communicate with each other.

The external cooling apparatus 110 of the present exemplary embodiment includes a sheet cooling unit 20 serving as a sheet cooling portion for cooling the sheet S and upstream and downstream conveyance units 40 and 60 that passes and receives the sheet S to/from the sheet cooling unit 20. The upstream conveyance unit 40 conveys and passes the sheet S discharged out of the image forming apparatus 100 to the sheet cooling unit 20. The downstream conveyance unit 60 receives the sheet S from the sheet cooling unit 20 and conveys toward the sheet processing apparatus 310. The upstream conveyance unit 40, the downstream conveyance unit 60 and the sheet cooling unit 20 form a series of sheet conveyance paths 210 within the external cooling apparatus 110. The external cooling apparatus 110 serving as the sheet conveyance apparatus or as the sheet cooling unit will be described in detail later.

The sheet S cooled by the external cooling apparatus 110 is conveyed to the sheet processing apparatus 310. The sheet S conveyed to the sheet processing apparatus 310 undergoes a punching process through which the sheet S is punched by the sheet processing apparatus 310 or a stapling process through which a bundle of sheets S is stapled. In a case of performing the punching process, the sheet processing apparatus 310 executes the punching process by temporarily stopping the sheet S at a punching processing portion 314. Then, a conveyance path is switched by a discharge destination switching portion 311 and the punched sheet S is discharged onto an upper sheet discharge tray 312. Meanwhile, in a case of performing the stapling process, the sheet processing apparatus 310 switches the conveyance path by the discharge destination switching portion 311 to convey the sheets S to a stapling processing tray 315. Then, when a predetermined number of sheets S are loaded on the stapling processing tray 315, stapling is conducted by a stapler 316. After that, the bundle of the stapled sheets S is discharged onto a lower sheet discharge tray 313.

External Cooling Apparatus

Figure 3:
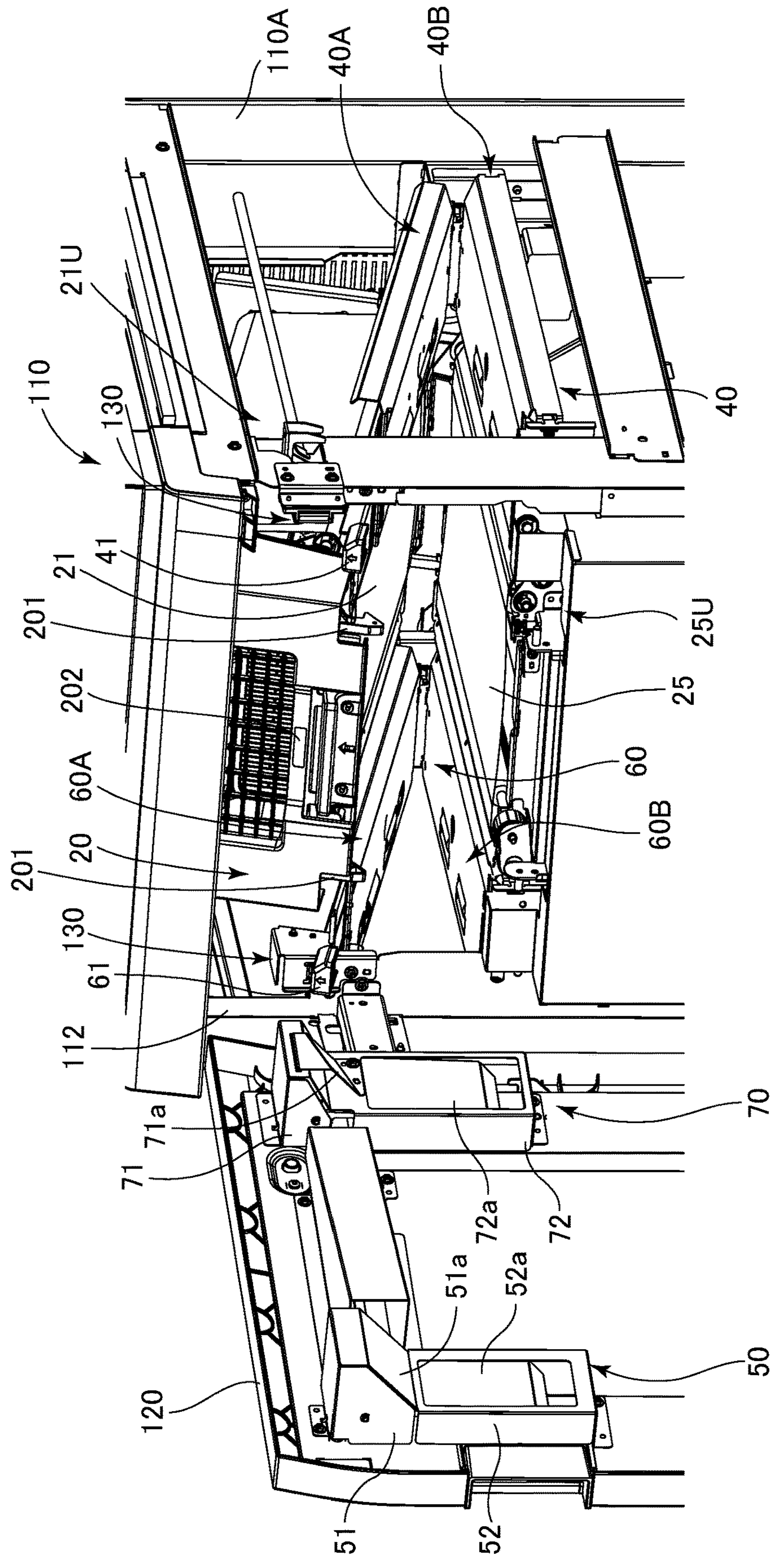
FIG. 3 is a partial perspective view illustrating an external cooling unit from which a front door is opened.
Figure 4:
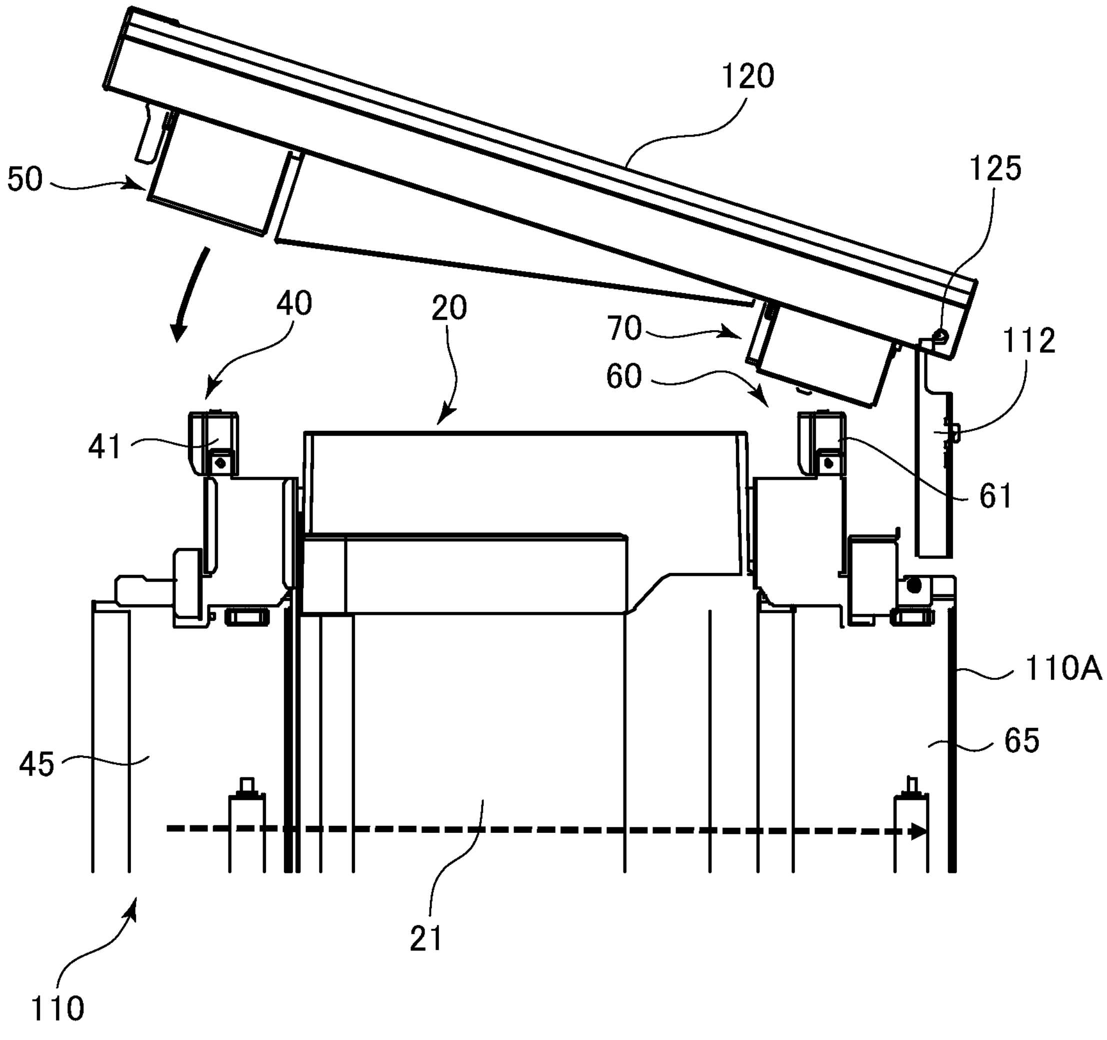
FIG. 4 is an upper section view illustrating the external cooling unit.

Next, the external cooling apparatus 110 will be described with reference to FIGS. 3 through 12. FIG. 3 is a schematic diagram illustrating the external cooling unit 110 from which a front door 120 is opened. FIG. 4 is an upper section view illustrating the external cooling apparatus 110 from which the front door 120 is opened.

As illustrated in FIGS. 3 and 4, an apparatus body 110A of the external cooling apparatus 110 is provided with the front door 120 so as to be pivotable to an open state and to a close state. The front door 120 composes a part of an appearance of the external cooling apparatus 110 in the close state. A user can access to the sheet cooling unit 20, the upstream conveyance unit 40, the downstream conveyance unit 60 and the like within the apparatus body 110A from outside of the apparatus body 110A by opening the front door 120. In a case of the present exemplary embodiment, the front door 120 is configured to be openable with respect to the apparatus body 110A, e.g., a frame 112, serving as a support frame member centering on a pivot shaft 125 extending in a perpendicular direction. The pivot shaft 125 is provided downstream in the sheet conveyance direction close to the downstream conveyance unit 60 rather than the upstream conveyance unit 40. In a case where a jam occurs, the user can manually operate the upstream conveyance unit 40 or the downstream conveyance unit 60 by opening the front door 120 to remove the sheet S stagnated therein. Note that an upstream closing unit 50 and a downstream closing unit 70 are provided at positions on an inner surface of the front door 120 facing the upstream conveyance unit 40 and the downstream conveyance unit 60, respectively, in a state in which the front door 120 is closed. Their details will be described later.

Sheet Cooling Unit

Figure 5:
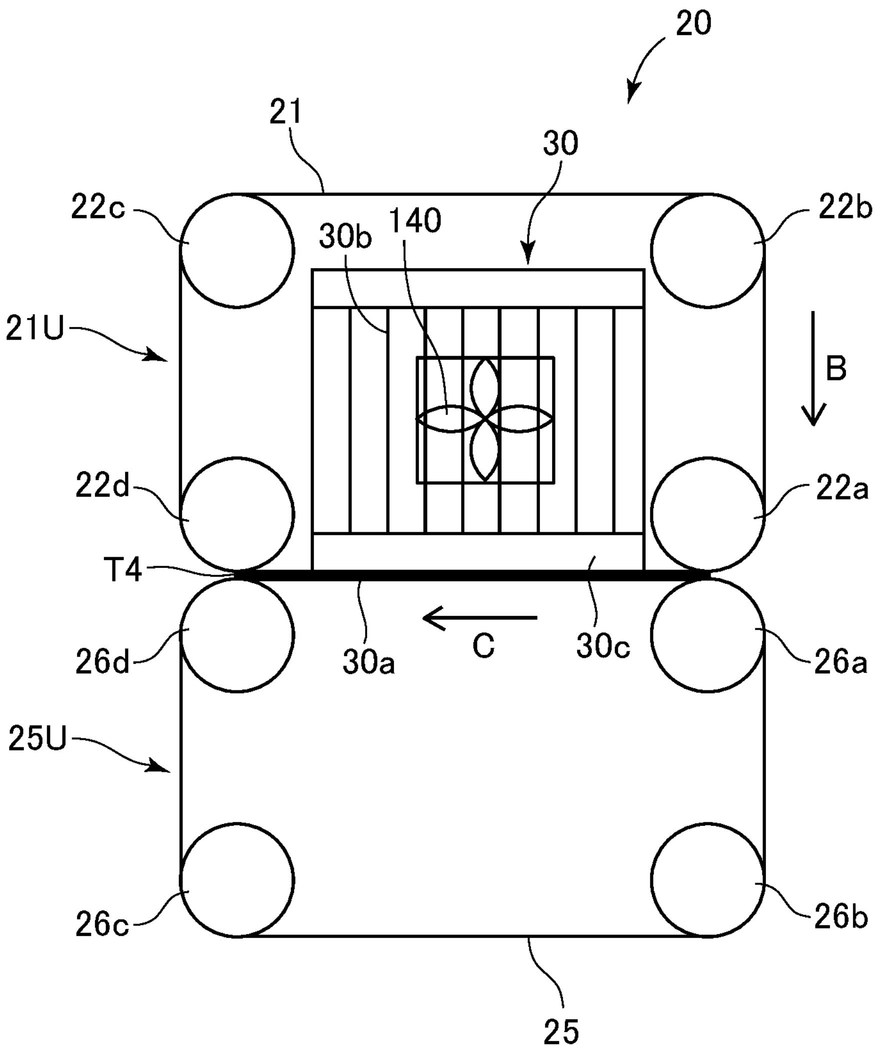
FIG. 5 is a schematic diagram illustrating a sheet cooling unit.

FIG. 5 illustrates one example of the sheet cooling unit 20. The sheet cooling unit 20 in FIG. 5 is a belt cooling type cooling unit. As illustrated in FIG. 5, the sheet cooling unit 20 roughly includes a first cooling unit 21U and a second cooling unit 25U. The first cooling unit 21U includes a first belt 21, and the second cooling unit 25U includes a second belt 25 that conveys the sheet S while nipping with the first belt 21. The first and second belts 21 and 25 are endless belts formed into a shape of film by using high strength polyimide for example.

The first belt 21 is wrapped around a plurality of first belt stretching rollers 22*a*,22*b*,22*c* and 22*d*, and at least one of the first belt stretching rollers 22*a*, 22*b*,22*c* and 22*d* is rotated by a driving motor not illustrated. Thereby, the first belt 21 rotates in a direction of an arrow B in FIG. 5. Meanwhile, the second belt 25 is wrapped around a plurality of second belt stretching rollers 26*a*,26*b*,26*c* and 26*d* and is in contact with an outer circumferential surface of the first belt 21. Therefore, the second belt 25 is driven and is rotated by the first belt 21. Note while the first belt 21 is rotated such that the second belt 25 is driven following to the first belt 21 here, the second belt 25 may be rotated such that the first belt 21 is driven following to the second belt 25 in contrary. Alternatively, both the first belt 21 and the second belt 25 may be rotated by the driving motor.

The sheet S discharged out of the image forming apparatus 100 is nipped between the first and second belts 21 and 25 and is conveyed in a conveyance direction, i.e., in a direction of an arrow C in FIG. 5. At this time, the sheet S passes through a cooling nip T4 formed by the first and second belts 21 and 25 being in contact with each other. In a case of the present exemplary embodiment, the first cooling unit 21U includes a heat sink 30, and the first belt 21 is cooled by the heat sink 30. In order to efficiently cool the sheet S, the heat sink 30 is disposed so as to come into contact with an inner circumferential surface of the first belt 21 at a part where the cooling nip T4 is formed. The sheet S is cooled through the first belt 21 in passing through the cooling nip T4. As the sheet S is cooled, the toner on the sheet S is cooled and is more adhered onto the sheet S.

The heat sink 30 serving as a cooling portion is a heat radiating plate made of metal such as aluminum. The heat sink 30 includes a heat receiving portion 30*a* for drawing heat out of the first belt 21 by being in contact the first belt 21, a heat radiating portion 30*b* for radiating heat and a fin base 30*c* for conducting heat from the heat receiving portion 30*a* to the heat radiating portion 30*b*. The heat radiating portion 30*b* is formed of a large number of heat radiating fins to gain more contact area with air and to accelerate efficient heat radiation. Still further, in order to forcefully cool the heat sink 30 itself, there is provided a cooling fan 140 for blowing air to the heat radiating portion 30*b*. The cooling fan 140 is driven by a motor not illustrated, and its air quantity is set at 2 m3/min, for example. Note that the heat sink 30 may be cooled by means other than the cooling fan 140.

Itis also noted that while the heat sink 30 is brought into contact with the first belt 21 to cool the first belt 21 in the exemplary embodiment described above, the present disclosure is not limited to such configuration and the heat sink 30 may be brought into contact with the second belt 25 to cool the second belt 25. Alternatively, the heat sinks 30 may be provided per the first and second cooling units 21U and 25U to cool both of the first belt 21 and the second belt 25. Still further, the first and second belts 21 and 25 may be cooled not only by the heat sink 30 but also by a belt cooling fan for blowing air to the belt or by a water cooling unit in which a pipe or like in which cold liquid circulates is brought into contact with the belt.

Returning to the description of FIG. 3, the sheet cooling unit 20 described above is provided such that the first cooling unit 21U is pivotable with respect to the second cooling unit 25U. According to the present exemplary embodiment, the pivot shaft 125 (see FIG. 4) extending along the sheet conveyance direction is provided at a rear position on an opposite side from the front door 120 in a front-back direction which is a direction orthogonal to the perpendicular direction and the sheet conveyance direction. Then, the first cooling unit 21U is configured such that a front side thereof facing the front door 120 in the front-back direction is openable/closable in a vertical direction. The user can disengage a hocked-end latch portion 201 and the second cooling unit 25 by operating a grip 202 of the first cooling unit 21U, and can lift up the first cooling unit 21U. This arrangement is made to enable the user to remove the sheet S stagnating in the sheet cooling unit 20 in a case where a jam occurs. Note that although no illustration is made, the first cooling unit 21U adopts a so-called free-stop configuration in which a damper is provided at a hinge part of the pivot shaft so that the first cooling unit 21U can stay at an arbitrary position while being opened.

Conveyance Unit

Still further, as illustrated in FIG. 3, the external cooling apparatus 110 is configured such that the upstream conveyance unit 40 is disposed upstream in the sheet conveyance direction and the downstream conveyance unit 60 is disposed downstream, i.e., on a side close to a rotational axis of the front door 120 here, so as to sandwich the sheet cooling unit 20. The upstream and downstream conveyance units 40 and 60 are also configured to be pivotable such that the user can remove the sheet S stagnated in the upstream and downstream conveyance units 40 and 60. The upstream and downstream conveyance units 40 and 60 will now be described with reference to FIGS. 6A and 6B.

Note that because the upstream and downstream conveyance units 40 and 60 have substantially the same configuration, though they are partly different, the following description will be made by exemplifying the downstream conveyance unit 60. As for the upstream conveyance unit 40, reference signs of corresponding components will be described within parentheses in FIGS. 6A and 6B. Still further, FIGS. 6A and 6B illustrate a case where an upper guide portion 60A is located, with respect to a lower guide portion 60B, at an open position where no sheet conveyance path is formed within the sheet cooling unit 20.

Figure 6A:
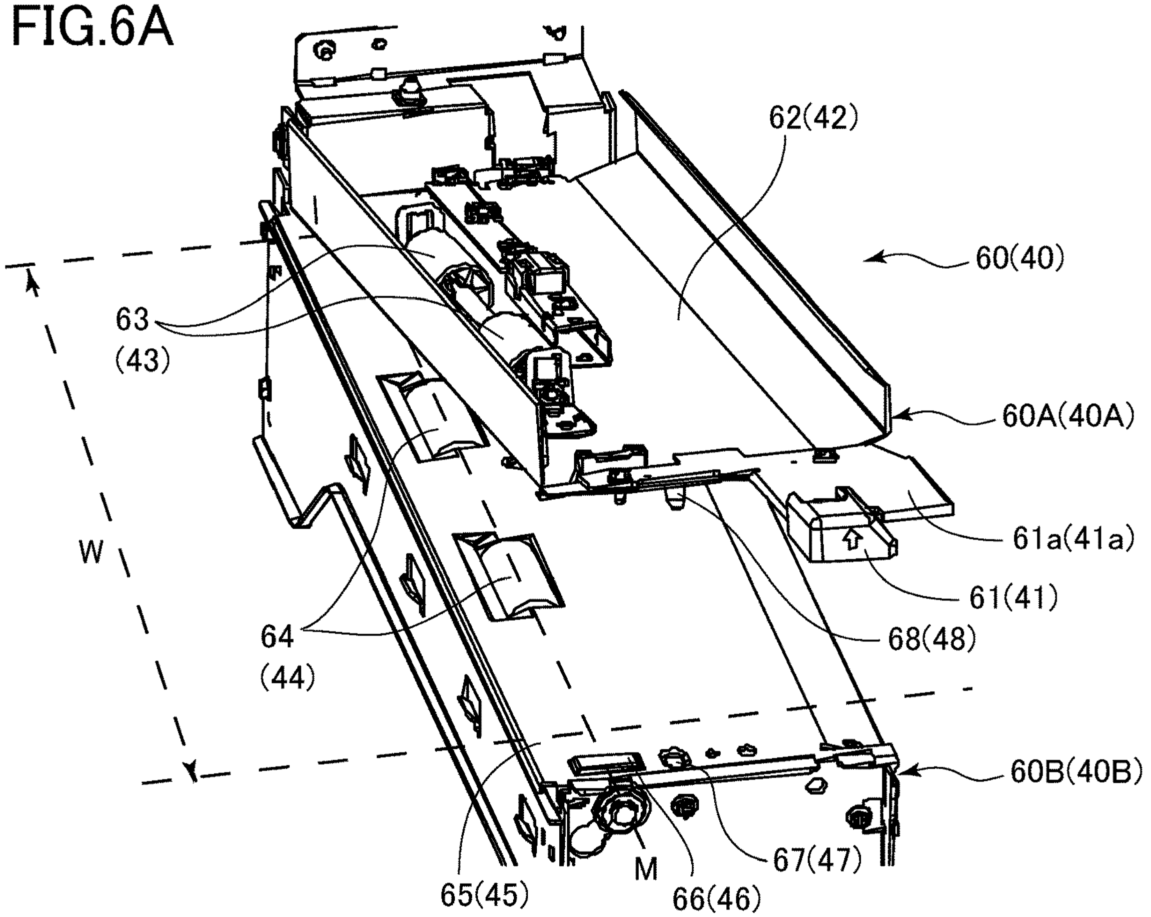
FIG. 6A is a perspective view illustrating an upstream conveyance unit viewed from an obliquely upward direction.
Figure 6B:
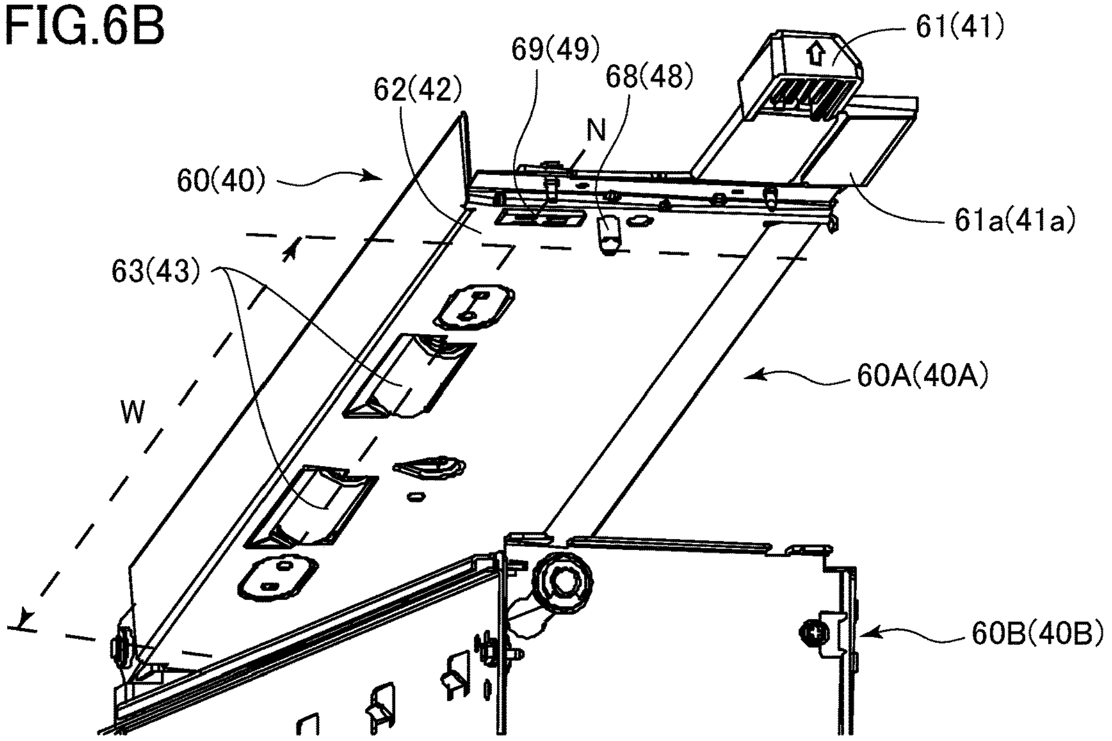
FIG. 6B is a perspective view illustrating the upstream conveyance unit viewed from an obliquely downward direction.

As illustrated in FIGS. 6A and 6B, the downstream conveyance unit 60 includes the lower guide portion 60B and the upper guide portion 60A. According to the present exemplary embodiment, the lower and upper guide portions 60B and 60A form a part of the sheet conveyance path 210 within the external cooling apparatus 110 (see FIG. 1) and can convey the sheet S in a case where the upper guide portion 60A is located at a close position where the upper guide portion 60A is closed with respect to the lower guide portion 60B.

The lower guide portion 60B is provided with a first guide plate 65 and driving rollers 64 serving as first rollers and the upper guide portion 60A is provided with a second guide plate 62 and driven rollers 63 serving as second rollers. In a case where the upper guide portion 60A is located at the abovementioned close position, the lower guide portion 60B and the upper guide portion 60A face each other so as to nip the sheet S. The first guide plate 65 is disposed along the sheet conveyance path so as to guide one surface of the sheet S and the second guide plate 62 is disposed along the sheet conveyance path so as to guide another surface of the sheet S opposite from one surface.

The first guide plate 65 is provided with opening portions perforated therethrough and driving rollers 64 rotationally driven by a motor not illustrated are rotatably provided so as to expose out of the opening portions. In the same manner, the second guide plate 62 is provided with opening portions perforated therethrough and driven rollers 63 are rotatably provided so as to expose out of the opening portions and to come into contact with the driving rollers 64. The driven rollers 63 press the driving rollers 64 by an urging force of a compression spring not illustrated, so that the driving and driven rollers 64 and 63 serving as a rotating conveyance portion can nip and convey the sheet S.

The upper guide portion 60A described above is provided to be pivotable with respect to the lower guide portion 60B so as to move between the close position, i.e., a first position, where the upper and lower guide portions 60A and 60B form the sheet conveyance path to convey the sheet S and the upper open position, i.e., a second position, where the upper and lower guide portions 60A and 60B open the sheet conveyance path and do not convey the sheet S. The second guide plate 62 of the upper guide portion 60A is pivotable between the close position and the open position centering on a pivot shaft extending in a horizontal direction. Then, the upper guide portion 60A is provided with a jam releasing lever 61 serving as an operation portion which is to be held and operated by the user such that the user can pivotably and manually operate the upper guide portion 60A between the close position and the open position. The jam releasing lever 61 is projectively provided toward the front side facing the front door 120 from an end portion of the second guide plate 62 in a width direction, i.e., in a direction crossing with the sheet conveyance direction (see FIG. 4) such that the user can operation while opening the front door 120 (see FIG. 3). In a case where the user is to move the upper guide portion 60A from the close position to the open position, the user can bring up the upper guide portion 60A while holding the jam releasing lever 61. Meanwhile, in a case where the user is to move the upper guide portion 60A from the open position to the close position, the user can bring down the upper guide portion 60A while holding the jam releasing lever 61. Note that the jam releasing lever 61 is provided projecting toward the side of the front door 120 more than the sheet cooling unit 20 such that the user can readily operation while holding the jam releasing lever 61 (see FIG. 4).

The second guide plate 62 is also provided with a pin 68 projecting toward the side of the first guide plate 65. In a case where the upper guide portion 60A is moved to the close position, the pin 68 is inserted through a pin fitting hole 67 perforated through the first guide plate 65. Thereby, a move of the pin 68 in the sheet conveyance direction is restricted by the pin fitting hole 67 and relative positions in the sheet conveyance direction of the upper and lower guide portions 60A and 60B are determined. The pin 68 and pin fitting hole 67 are formed respectively in a vicinity of the rotational axis of the driven roller 63 and the driving roller 64 in the sheet conveyance direction. Thereby, it is possible to suppress a deflection amount of alignment of the driven roller 63 and the driving roller 64 that rotate in contact with each other in the downstream conveyance unit 60 configured to be openable. It is possible to suppress a skew of the sheet S in conveying the sheet S by suppressing the alignment deflection amount of the driven roller 63 and the driving roller 64 because a rotational axis of the driven roller 63 and a rotational axis of the driving roller 64 can be kept in parallel.

Still further, a lengthy magnet 69 serving as a guide holding magnet which is long in the sheet conveyance direction is attached to the surface where the pin 68 is formed on the second guide plate 62 as illustrated in FIG. 6B in order to keep the upper guide portion 60A at the close position. Still further, as illustrated in FIG. 6A, the first guide plate 65 is provided with a magnet attracting portion 66 formed at a place where the magnet 69 faces when the upper guide portion 60A is located at the close position. In a case where the upper guide portion 60A is moved to the close position, the upper guide portion 60A is held at the close position as the magnet 69 sticks with the magnet attracting portion 66 by its magnetic force. The pin 68, the magnet 69, the pin fitting hole 67 and the magnet attracting portion 66 are provided outside, i.e., on the side of the end portion, of a widthwise area W which permits a maximum size sheet among the sheets S to be conveyed to pass so as not to hamper the conveyance of the sheet S by the driven roller 63 and the driving roller 64.

Note that it is preferable to provide at least a part of the magnet 69 at a position overlapping with a rotational axis N of the driven roller 63 in the sheet conveyance direction and to provide at least a part of the magnet attracting portion 66 at a position overlapping with a rotational axis M of the driving roller 64. This arrangement makes it possible to suppress a sheet conveyance force from being dispersed because the driven roller 63 and the driving roller 64 come into contact with each other with a uniform and adequate pressure in the rotational axis direction, i.e., in the width direction, by the magnetic force of the magnet 69 when the upper guide portion 60A is located at the close position.

Because the free-stop configuration is not adopted for the upper guide portion 60A, differing from the first cooling unit 21U, in the case of the present exemplary embodiment, the upper guide portion 60A cannot stay at an arbitral position in the open state. However, if the upper guide portion 60A is not kept at the open position and falls down by itself to the close position by own weight, it is hard for the user to remove the sheet S.

Then, according to the present exemplary embodiment, two guide holding members 130 are provided on frames 112 of the apparatus body 110A as illustrated in FIG. 3 to be able to hold the upper guide portion 40A (60A) of the respective upstream and downstream conveyance units 40 and 60 at the open position. The guide holding member 130 will now be described with reference to FIG. 3 and by using FIG. 7.

Guide Holding Member

Figure 7:
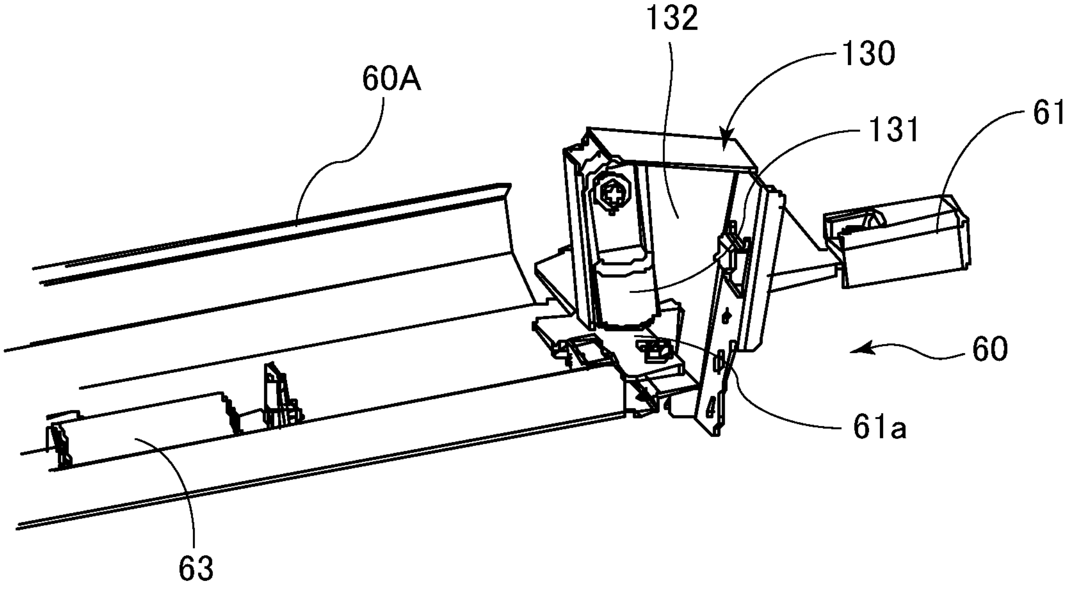
FIG. 7 is a perspective view illustrating a guide holding member.

As illustrated in FIG. 7, the guide holding member 130 includes a magnet 131 serving as a holding portion and a magnet attaching portion 132. The magnet 131 is attached to the magnet attaching portion 132 such that a tip thereof faces the upper guide portion 60A, i.e., downward in FIG. 7. The guide holding member 130 is fixed to the frame 112 of the apparatus body 110A through the magnet attaching portion 132. A magnet attracting portion 61*a* formed of a sheet metal is provided at a widthwise tip of the second guide plate 62. The magnet attracting portion 61*a* may be formed integrally with the jam releasing lever 61 described above.

The magnet 131 is disposed on a locus along which the magnet attracting portion 61*a* moves along with the pivot of the second guide plate 62 and sticks with the magnet attracting portion 61*a* by its magnetic force as the second guide plate 62 pivots and arrives at the open position. This arrangement makes it possible to hold the upper guide portion 60A at the open position and to prevent the upper guide portion 60A from moving from the open position to the close position by its own weight. In this case, it is necessary to release the second guide plate 62 held by the magnet 131 in order to move the upper guide portion 60A from the open position to the close position. Here, the user can release the second guide plate 62 held by the magnet 131 by holding and lowering the jam releasing lever 61.

Note that although the present exemplary embodiment has been arranged such that the upper guide portion 60A is held at the open position by the magnet 131, the present disclosure is not limited to such configuration. For instance, instead of the magnet 131, a hook-like engaging projection may be provided on the frame 112 of the apparatus body 110A and an engagement hole may be formed on the upper guide portion 60A instead of the magnet attracting portion 61*a*. In such a case, the upper guide portion 60A is held at the open position by engaging the engaging projection with the engagement hole. Still further, the upper guide portion 60A is held at the close position by the magnet 69, the present disclosure is not limited to such configuration. However, it is preferable to hold the upper guide portion 60A at the close position by the magnet 69 in order to suppress dispersion of the sheet conveyance force as described above.

It is noted that a projection amount, i.e., a length, of the pin 68 from the second guide plate 62 is set such that the tip of the pin 68 is inserted into the pin fitting hole 67 before the magnet 69 arrives at the magnet attracting portion 66 in moving the upper guide portion 60A from the open position to the close position. That is, as illustrated in FIG. 6B, the tip of the pin 68 projects more to the side of the lower guide portion 60B than the magnet 69. That is, the pin 68 is inserted into the pin fitting hole 67 before the upper guide portion 60A arrives at the close position. This arrangement makes it possible to position the upper and lower guide portions 60A and 60B in a plane direction by the pin 68 and the pin fitting hole 67 when the upper guide portion 60A moving from the open position to the close position arrives at a position where the pin 68 engages with the pin fitting hole 67. Accordingly, because the upper guide portion 60A moves to the close position while being guided by the pin 68 and the pin fitting hole 67, the magnet 69 provided on the upper guide portion 60A can be steadily attracted with the magnet attracting portion 66 provided on the lower guide portion 60B. This arrangement makes it possible to bring the driven roller 63 and the driving roller 64 adequately into contact with each other.

By the way, when a jam occurs, the user opens the front door 120 at first and then performs a work of removing the sheet S stagnated in the upstream conveyance unit 40 or the downstream conveyance unit 60. For instance, in a case where the sheet S is jammed in the downstream conveyance unit 60, the user brings up the jam releasing lever 61 to move the upper guide portion 60A from the close position to the open position. Then, after removing the sheet S, the user presses down the jam releasing lever 61 to move the upper guide portion 60A from the open position to the close position. Then, after moving the upper guide portion 60A to the close position, the user closes the front door 120. However, in a case where the user closes the front door 120 without returning the upper guide portion 60A to the close position, there is a possibility that the downstream conveyance unit 60 is damaged by being pressed by the front door 120. There is also a possibility of damaging the upstream conveyance unit 40 in the similar condition.

Then, the present exemplary embodiment is arranged such that the upstream conveyance unit 40 or the downstream conveyance unit 60 is not damaged even if the user closes the front door 120 without returning the upper guide portion 40A or the upper guide portion 60A. A configuration of the present exemplary embodiment for realizing such a situation will be described below.

As illustrated in FIG. 3, upstream and downstream closing units 50 and 70 are provided on an inner surface of the front door 120. According to the present exemplary embodiment, the downstream closing unit 70 comes into contact with the jam releasing lever 61 of the downstream conveyance unit 60 at first along with a closing operation of the front door 120, and then the upstream closing unit 50 comes into contact with the jam releasing lever 41 of the upstream conveyance unit 40 along with the closing operation of the front door 120.

Upstream Closing Unit

The upstream closing unit 50 will be described with reference to FIG. 3 and FIGS. 8 through 10D. As illustrated in FIG. 3, the upstream closing unit 50 includes an upstream holding releasing portion 51 serving as a releasing portion and an upstream guide portion 52 serving as a guide portion.

Upstream Holding Releasing Portion

Firstly, the upstream holding releasing portion 51 will be described. The upstream holding releasing portion 51 is provided so as to form an inclined surface 51*a* that projects out of the inner surface of the front door 120 and is inclined in a gravity direction. The inclined surface 51*a* is formed such that an upper side thereof, in the perpendicular direction, intrudes deeply into the apparatus body 110A more than a lower side thereof. Along with the closing operation of the front door 120, the upstream holding releasing portion 51 butts against the jam releasing lever 41 of the upstream conveyance unit 40 and releases the second guide plate 42 held at the open position by the guide holding member 130 or specifically by the magnet 131 (see FIG. 7).

Figure 8:
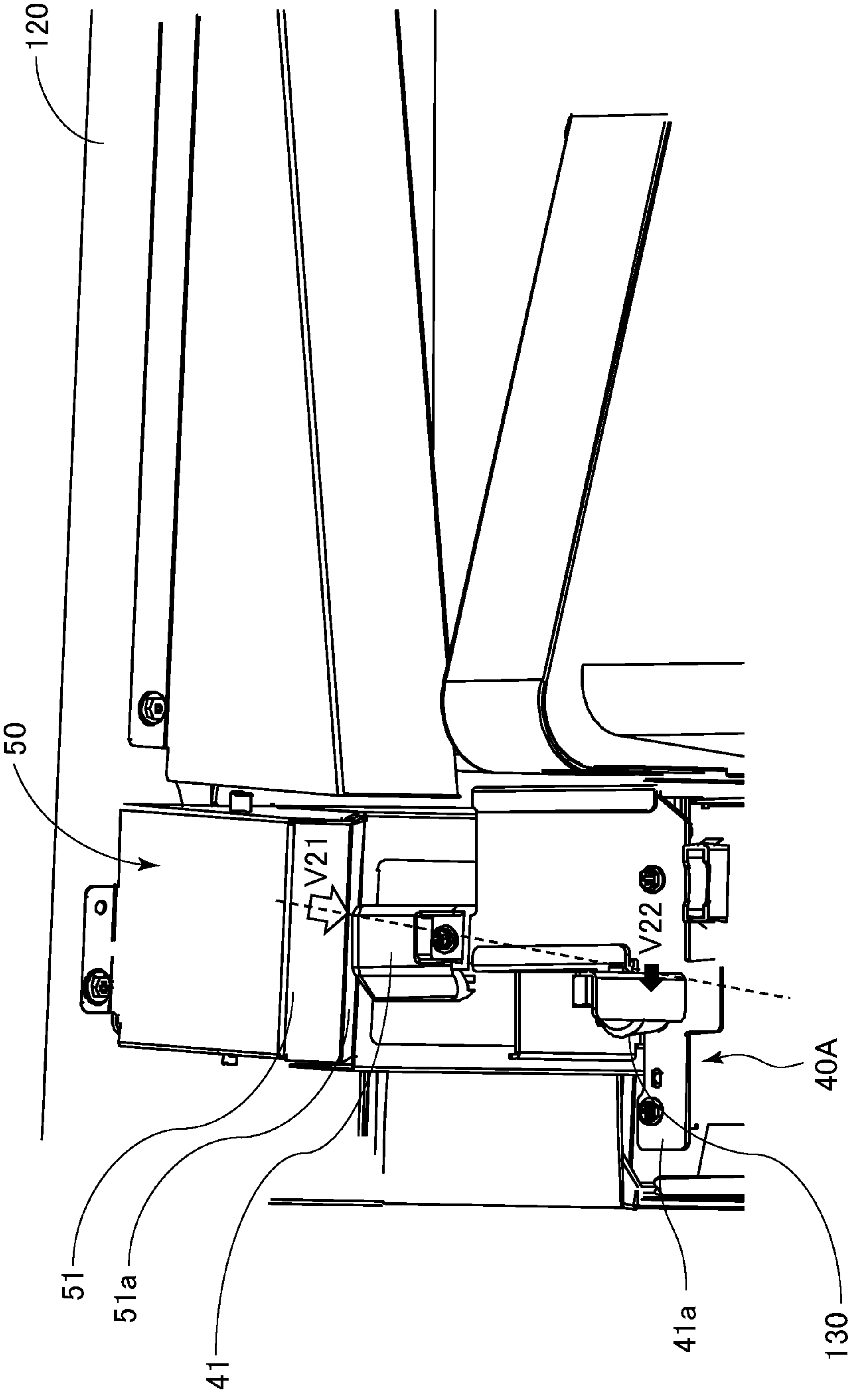
FIG. 8 is an enlarged perspective view illustrating an upstream holding releasing portion.
Figure 9:
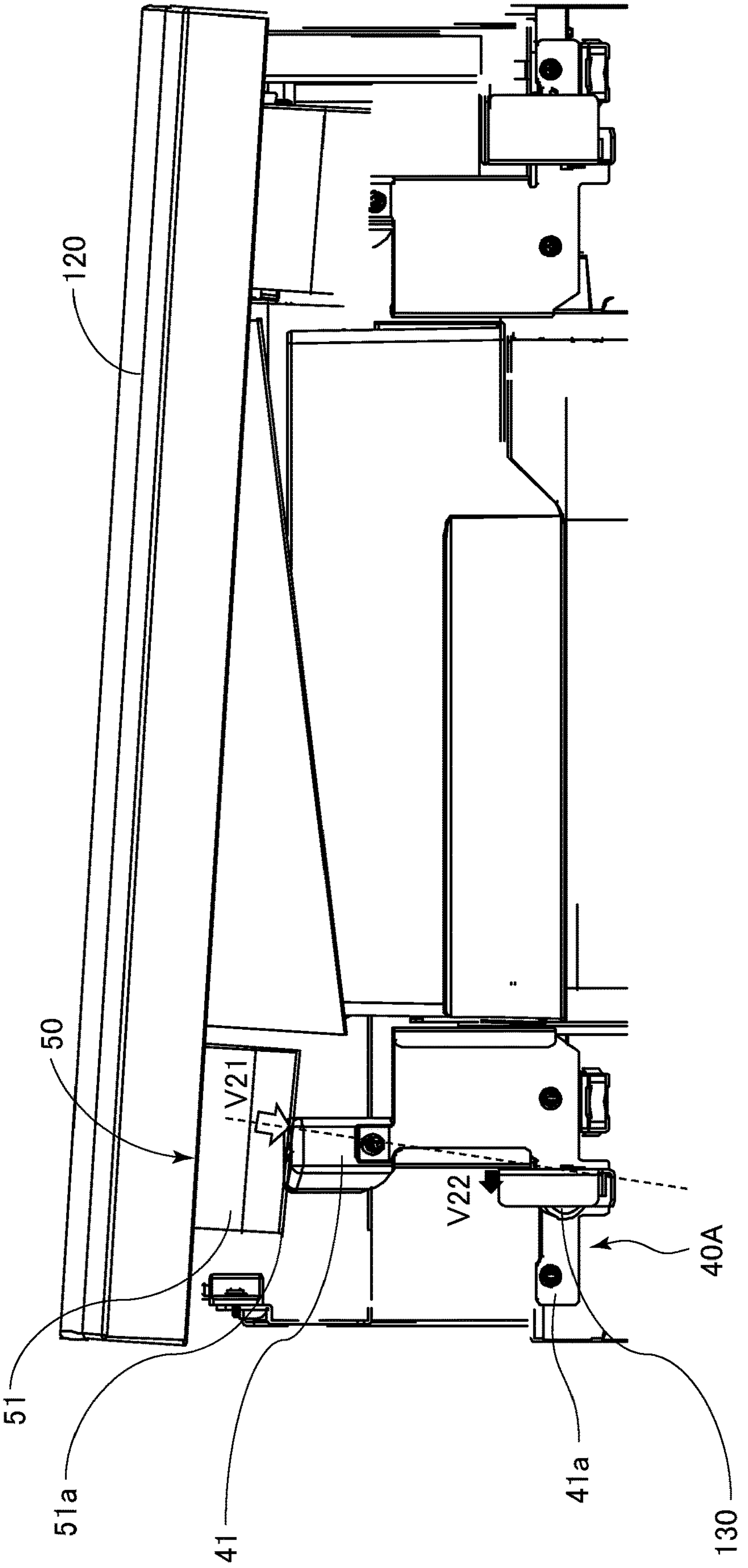
FIG. 9 is an enlarged top view illustrating the upstream holding releasing portion.

That is, as illustrated in FIGS. 8 and 9, the upstream holding releasing portion 51 of the front door 120 butts against the tip of the jam releasing lever 41 serving as the operation portion when the front door 120 is closed. Note that the downstream closing unit 70 is not illustrated in FIG. 9. When the front door 120 is closed further from when the upstream holding releasing portion 51 has butted against the tip of the jam releasing lever 41, the jam releasing lever 41 is pressed by the front door 120 and is moved downward in the gravity direction along the inclined surface 51*a* of the upstream holding releasing portion 51. Thereby, the upper guide portion 40A moves downward and the magnet attracting portion 41*a* separates from the guide holding member 130, so that the upper guide portion 40A, i.e., the second guide plate 42, held by the magnet 131 (see FIG. 7) is released.

The upper guide portion 40A after being released from the held condition moves downward by being pressed by the front door 120 in the condition in which the jam releasing lever 41 butts against the upstream holding releasing portion 51. That is, the upstream holding releasing portion 51 is formed such that a force in the width direction applied to the upper guide portion 40A along with the closing operation of the front door 120 of the user is separated into components of force in the width direction and in a downward direction by the inclined surface 51*a*. This arrangement makes it possible to suppress the upper guide portion 40A from being damaged along with the closing operation of the front door 120 during when the upper guide portion 40A is in contact with the upstream holding releasing portion 51. Still further, even if the force is separated, because the force in the width direction is applied to the upper guide portion 40A, the upper guide portion 40A will not fall at once down to the close position by its own weight.

It is noted in a case of the present exemplary embodiment, one end portion of the upper guide portion 40A in the sheet conveyance direction is in contact with the guide holding member 130 and a move in the sheet conveyance direction thereof is regulated by the guide holding member 130 during the move of the upper guide portion 40A while the jam releasing lever 41 is in contact with the upstream holding releasing portion 51. To that end, the magnet attaching portion 132 is provided with a regulating plane extending in the gravity direction or in an opening/closing direction of the upper guide portion 40A here. That is, the guide holding member 130 also functions as a regulating portion that comes into contact with the second guide plate 42 on the side of the pivot shaft 125 (see FIG. 4) of the front door 120 in the sheet conveyance direction and regulates the second guide plate 42 from moving to the side of the pivot shaft 125 of the front door 120.

Upstream Guide Portion

Next, the upstream guide portion 52 will be described. As described above, as the upper guide portion 40A after being released from the holding condition is moved downward along the inclined surface 51*a* of the upstream holding releasing portion 51, the jam releasing lever 41 is moved downward in the perpendicular direction and arrives at an upstream guide portion 52 continuously provided under the upstream holding releasing portion 51. The upstream guide portion 52 guides the second guide plate 42 to the close position, i.e., the first position, through the jam releasing lever 41 while suppressing the move in the sheet conveyance direction of the jam releasing lever 41 of the second guide plate 42 that has been released by the upstream holding releasing portion 51.

As illustrated in FIG. 3, the upstream guide portion 52 is formed into a shape of a rectangular box having a hollow space inside and is provided with a retraction member 52*a* serving as a retraction portion therein. The upstream guide portion 52 is provided with an opening portion perforated on a surface of a same side with the inclined surface 51*a* of the upstream holding releasing portion 51, and the retraction member 52*a* is provided on an inner side of the upstream guide portion 52 and is exposed out of the opening portion. Then, the retraction member 52*a* is provided movably in a direction opposite from a direction in which the front door 120 is closed by butting against the jam releasing lever 41 along with the closing operation of the front door 120 as described later.

Figure 10A:
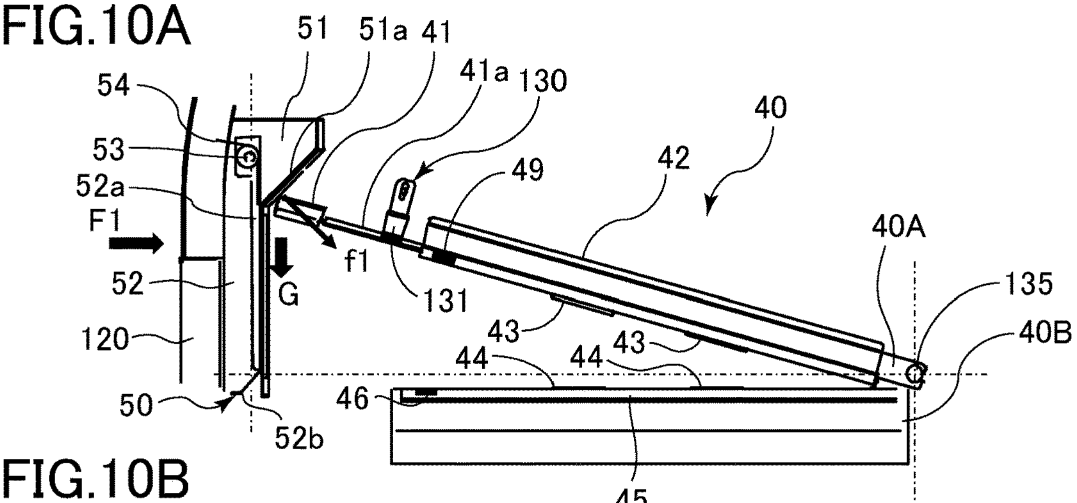
FIG. 10A is a schematic diagram illustrating an upstream guide portion in a state in which the front door is closed.

As illustrated in FIG. 10A, the retraction member 52*a* is provided pivotably with respect to the upstream guide portion 52. In a case of the present exemplary embodiment, the retraction member 52*a* has a pivot shaft 53 located higher than an elastic member 52*b*, i.e., a pressing portion, in the perpendicular direction and pivots centering on the upper side and by setting a side of the elastic member 52*b*, i.e., a side of the pressing portion, as a free end. The retraction member 52*a* and the elastic member 52*b* are integrally provided. The retraction member 52*a* is urged by a torsion spring 54 serving as an urging portion toward the opening portion of the upstream guide portion 52 or in other words, in a same direction with a direction in which the front door 120 is closed.

As described above, when the upstream holding releasing portion 51 of the front door 120 butts against the tip of the jam releasing lever 41 along with the closing operation of the front door 120, a force F1 in the width direction is applied to the upper guide portion 40A. The force F1 in the width direction applied to the upper guide portion 40A is separated into components in the width direction and the downward direction by the inclined surface 51*a* of the upstream holding releasing portion 51 (resultant force f1). Then, the upper guide portion 40A held by the magnet 131 is released by the resultant force f1, and the upper guide portion 40A falls down while frictionally sliding the jam releasing lever 41 with the inclined surface 51*a*.

Figure 10B:
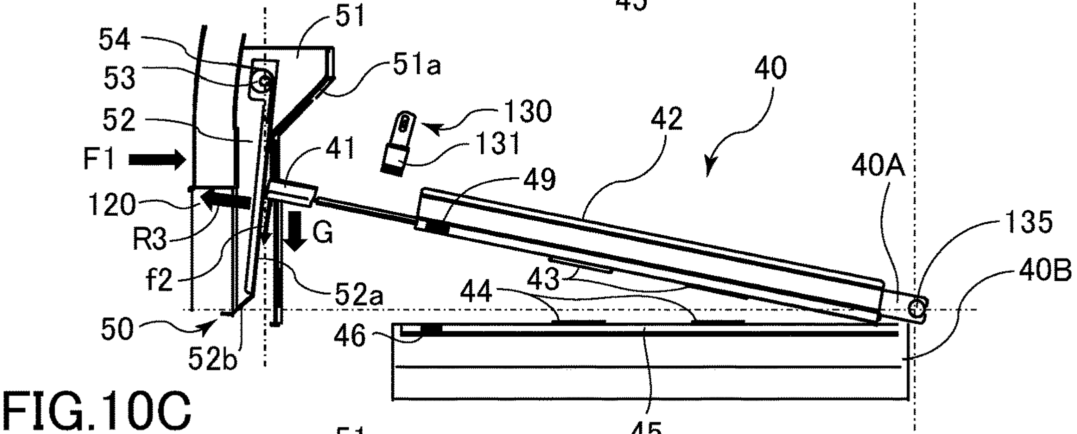

As the front door 120 is continuously closed, the tip of the jam releasing lever 41 arrives at the upstream guide portion 52 as illustrated in FIG. 10B and the tip of the jam releasing lever 41 intrudes into the upstream guide portion 52 through the opening portion and butts against the retraction member 52*a*. When the front door 120 is closed further as it is, the retraction member 52*a* is pressed by the jam releasing lever 41 and pivots centering on the pivot shaft 53 in a direction R3 opposite from the urging direction of the torsion spring 54. That is, the retraction member 52*a* swings in the R3 direction by abutting with the jam releasing lever 41 along with the move of the upper guide portion 40A moving from the open position to the close position. Then, the retraction member 52*a* retracts the elastic member 52*b* from a moving locus of the jam releasing lever 41.

Figure 10C:
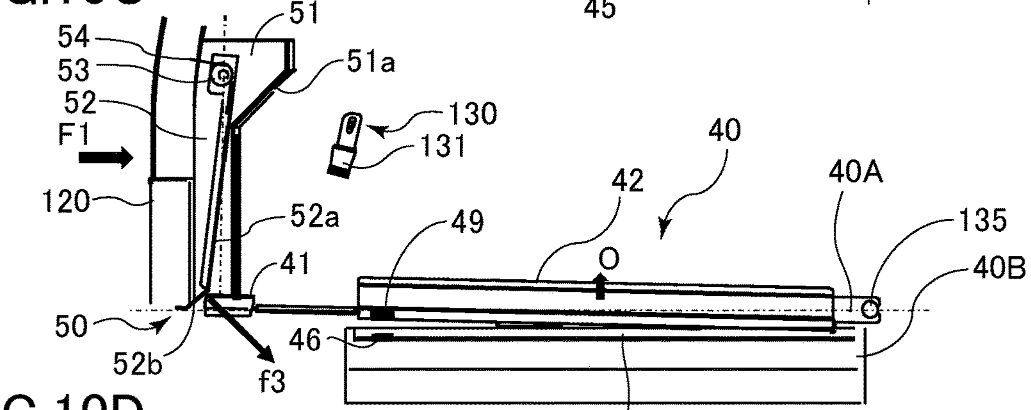

As illustrated in FIG. 10C, the upper guide portion 40A is moved to the close position as the jam releasing lever 41 slides with the retraction member 52*a*. At this time, because the force F1 in the width direction is applied to the upper guide portion 40A through the retraction member 52*a*, the upper guide portion 40A does not fall at once to the close position by its own weight. Still further, because the retraction member 52*a* operates so as to retract from the jam releasing lever 41 toward the outside of the front door 120, the upper guide portion 40A is suppressed from being damaged along with the closing operation of the front door 120. That is, because the retraction member 52*a* swings so as to retract from the pivoting locus of the jam releasing lever 41, the upper guide portion 40A is suppressed from being damaged along with the closing operation of the front door 120. It is noted that because the state in which the jam releasing lever 41 intrudes into the upstream guide portion 52 from the opening portion is maintained until when the upper guide portion 40A is moved to the close position, the move of the upper guide portion 40A in the sheet conveyance direction is limited while being moved by the upstream guide portion 52.

When the upper guide portion 40A is moved to the close position, the driven roller 43 of the upper guide portion 40A comes into contact with the driving roller 44 of the lower guide portion 40B, and the magnet 49, i.e., the guide holding magnet, of the upper guide portion 40A sticks with the magnet attracting portion 46 of the lower guide portion 40B. However, because the driven roller 43 is urged by a compression spring not illustrated, a reaction force O acts by the urging force of the compression spring when the driven roller 43, i.e., a second roller, comes into contact with the driving roller 44, i.e., a first roller. Therefore, when the upper guide portion 40A arrives at the close position, the magnet 49 does not immediately stick with the magnet attracting portion 46 and there is a case where the magnet 49 sticks with the magnet attracting portion 46 after the upper guide 40A has bounced for a while. Then, itis preferable to stick the magnet 49 with the magnet attracting portion 46 without bouncing the upper guide portion 40A by generating a force f3 by own weight of the retraction member 52*a* and an operation of the torsion spring 54. To that end, according to the present exemplary embodiment, the elastic member 52*b* such as a rubber plate is provided at a lower end portion of the retraction member 52*a*. The elastic member 52*b* elastically deforms by butting against the jam releasing lever 41 and presses the second guide plate 42 toward the first guide plate 45 through the jam releasing lever 41. That is, the elastic member 52*b* is one example of a pressing portion configured to press the jam releasing lever 41. The elastic member 52*b* presses the second guide plate 42 toward the first guide plate 45 and causes the magnet 49 to stick with the magnet attracting portion 46 by pressing the jam releasing lever 41 of the second guide plate 42 on a way when the second guide plate 42 moves from the open position to the close position. Still further, the second guide plate 42 is positioned at the close position as the elastic member 52*b* keeps pressing the jam releasing lever 41 of the second guide plate 42 at the close position. Itis noted that because the elastic member 52*b* swings so as to retract from the pivoting locus of the jam releasing lever 41 together with the retraction member 52*a*, the upper guide portion 40A is suppressed from being damaged along with the closing operation of the front door 120.

However, the elastic member 52*b* needs not to be always in contact with the jam releasing lever 41 in a case where the front door 120 is closed. Even in a configuration in which the elastic member 52*b* is not in contact with the jam releasing lever 41 in the case where the front door 120 is closed, the magnet 49 may be caused to stick with the magnet attracting portion 46 without bouncing the upper guide portion 40A by increasing the urging force of the torsion spring 54. Still further, the elastic member 52*b* may be noncontact with the jam releasing lever 41 in the case where the front door 120 is closed as long as an arrangement is made such that a force that causes the magnet 49 to stick with the magnet attracting portion 46 can be applied in a process of shifting from the open state to the closed state of the front door 120. It is noted that in a case of the configuration in which no magnet 49 is provided, it is possible to adopt a configuration in which the elastic member 52*b* is always in contact with the jam releasing lever 41 and presses the second guide plate 42 to the first guide plate 45 in the case where the front door 120 is closed.

Figure 10D:
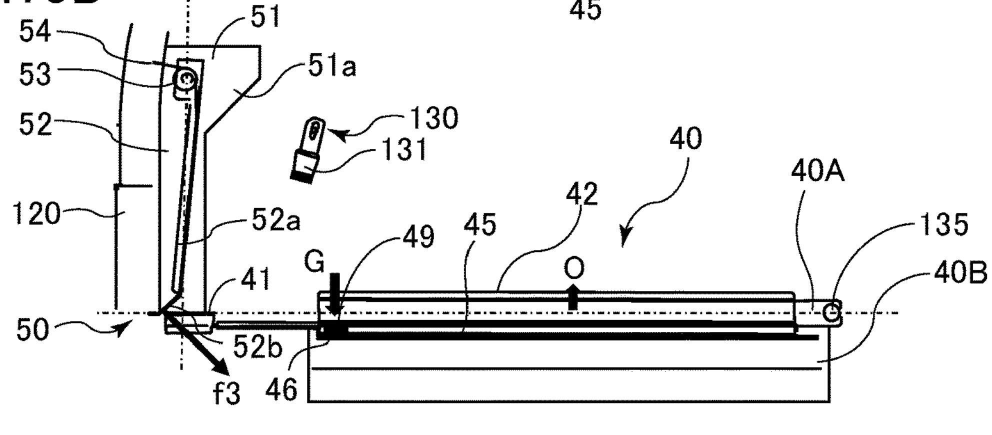
FIG. 10D is a schematic diagram illustrating the upstream guide portion in a state in which the front door is closed.

As illustrated in FIG. 10D, the upper guide portion 40A is held at the close position as the magnet 49 sticks with the magnet attracting portion 46 by the force f3 generated on the elastic member 52*b* of the retraction member 52*a* due to the force applied by the weight of the retraction member 52*a* and the urging force of the torsion spring 54. Thus, the upstream guide portion 52 moves the upper guide portion 40A along with the closing operation of the front door 120 while retracting the second guide plate 42 which has been released from the magnet 131 so as not to be damaged by being pressed by the front door 120 and such that the second guide plate 42 does not fall at once to the close position by its own weight.

Downstream Closing Unit

Next, the downstream closing unit 70 will be described with reference to FIGS. 3, 11 and 12. As illustrated in FIG. 3, the downstream closing unit 70 includes a downstream holding releasing portion 71 serving as a releasing portion and a downstream guide portion 72 serving as a guide portion. The downstream guide portion 72 is formed into a shape of a rectangular box having an internal hollow, and a retraction member 72*a* serving as a retraction portion is provided therein. A configuration of the downstream guide portion 72 is the same with that of the upstream guide portion 52 of the upstream closing unit 50 described above, its description will be omitted here.

Downstream Holding Releasing Portion

The downstream holding releasing portion 71 releases a second guide plate 62 held by the downstream guide holding member 130 or specifically the magnet 131 (see FIG. 7). While a same inclined surface with the inclined surface 51*a* of the upstream holding releasing portion 51 described above may be formed also on the downstream holding releasing portion 71, or as illustrated in FIG. 3, an inclined member 71*a* forming an inclined surface inclined also in the width direction in addition to the gravity direction is provided in the present exemplary embodiment. Because the downstream conveyance unit 60 is disposed on a side close to the rotational axis of the front door 120, it is difficult to release the second guide plate 62 held by the guide holding member 130 corresponding to the closing operation of the front door 120 if the same inclined surface with the inclined surface 51*a* of the upstream holding releasing portion 51 is adopted. That is, in a case where the downstream conveyance unit 60 is disposed on the side close to the rotational axis of the front door 120 and the same inclined surface with that of the upstream closing unit 50 disposed on the side far from the rotational axis is adopted, a great force needs to be applied to separate the magnet 131 from the magnet attracting portion 61*a* (see FIG. 7). Therefore, a possibility of damaging the downstream conveyance unit 60 increases.

Figure 11:
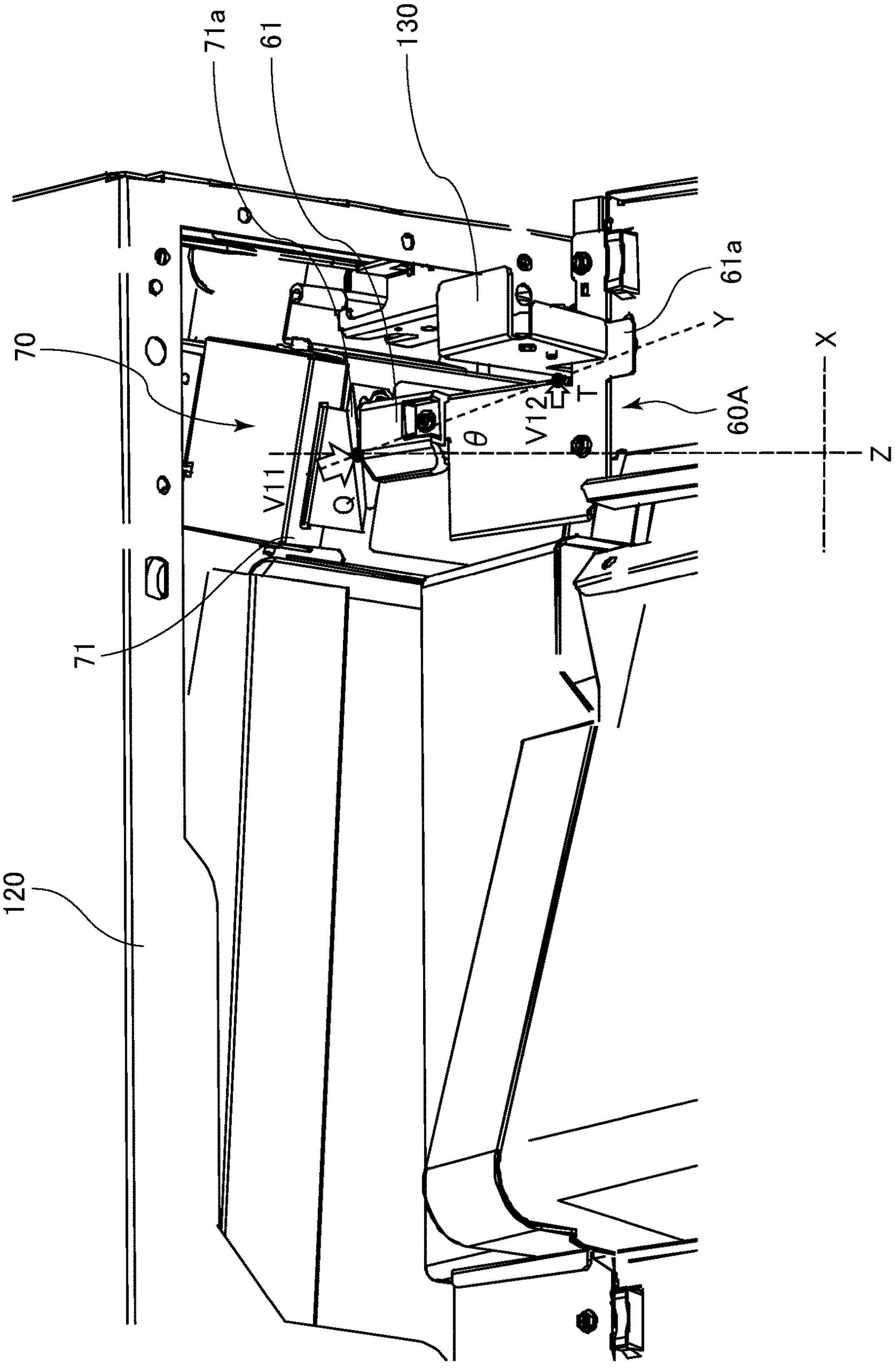
FIG. 11 is an enlarged perspective view illustrating a downstream holding releasing portion.
Figure 12:
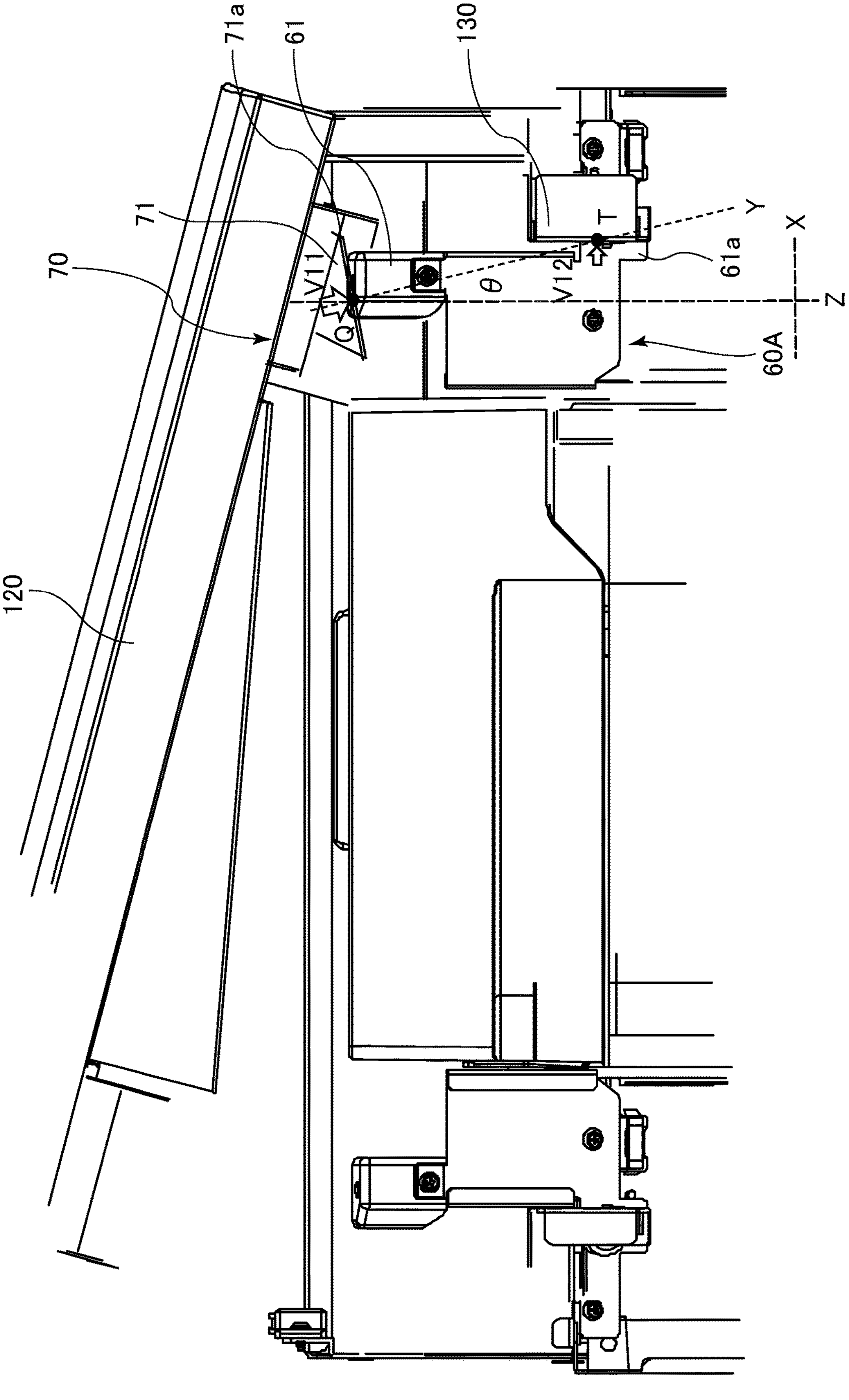
FIG. 12 is an enlarged top view illustrating the downstream holding releasing portion.

Then, according to the present exemplary embodiment, the downstream holding releasing portion 71 is provided with the inclined member 71*a* as illustrated in FIGS. 11 and 12. FIGS. 11 and 12 illustrate a state in which the inclined member 71*a* of the downstream holding releasing portion 71 starts to come into contact with the jam releasing lever 61 of the upper guide portion 60A located at the open position by being held by the guide holding member 130.

The inclined member 71*a* is provided so as to face the pivot shaft 125 of the front door 120. A disposed position and an orientation of the inclined surface of the inclined member 71*a* are determined based on a pivot direction, i.e., an arrow V11, of the front door 120, and a disposed position of the guide holding member 130 with respect to the upper guide portion 60A. As the position of the downstream holding releasing portion 71 comes closer to the rotational axis of the front door 120, ease of application of a necessary force for separating the magnet 131 from the magnet attracting portion 61*a* changes. Then, the ease of application of the necessary force for separating the magnet 131 from the magnet attracting portion 61*a* is adjusted by the orientation of the inclined surface of the inclined member 71*a*.

In the case of the present exemplary embodiment, the inclined surface serving as a butting portion of the inclined member 71*a* is formed obliquely such that a lower part thereof is closer to the inner surface of the front door 120, rather than the upper part thereof in the perpendicular direction. Still further, the inclined surface of the inclined member 71*a* is formed obliquely such that a part thereof closer to the pivot shaft of the front door 120, rather than a part far from the pivot shaft of the front door 120, is closer to the inner surface of the front door 120. Then, it is preferable to provide the inclined member 71*a* such that an angle θ formed by "a straight line Z which is a perpendicular line with respect to the rotational axis X of the upper guide portion 60A positioned at the open position and which passes through a butting point Q of the inclined surface of the inclined member 71*a* against which the jam releasing lever 61 butts" and "a straight line Y that passes through the butting point Q and an abutment point T of the guide holding member 130 with which the second guide plate 62 abuts" is equal to or more than 3° and equal to or less than 10°. It is preferable to provide the inclined member 71*a* such that the abovementioned angle θ to be formed is around 3.5°, though it depends on a distance between the downstream holding releasing portion 71 and the rotational axis of the front door 120.

While the downstream holding releasing portion 71 has been mainly described here, the same relationship holds also for the inclines surface 51*a* of the upstream holding releasing portion 51. However, the shape of the inclined surface 51*a* of the upstream holding releasing portion 51 is different from that of the inclined surface of the inclined member 71*a* because a positional relationship of the upper guide portion 40A and the upstream guide holding member 130 is opposite from a positional relationship of the upper guide portion 60A and the downstream guide holding member 130. Because the upstream holding releasing portion 51 is provided at the position separated further from the pivot shaft of the front door 120 than the downstream holding releasing portion 71, the inclined surface 51*a* may take a state inclined also in the width direction with respect to the jam releasing lever 41 along with the closing operation of the front door 120. Accordingly, the inclined surface 51*a* can release the upper guide portion 60A by the upstream holding releasing portion 51 even if the inclined surface 51*a* has the inclined surface different from the inclined member 71*a*.

In closing the front door 120, the inclined member 71*a* pressurizes the upper guide portion 60A in the pivot direction, i.e., in the direction of the arrow V11, of the front door 120 through the jam releasing lever 61 at the point, i.e., the butting point Q, where the inclined member 71*a* comes into contact with the jam releasing lever 61. This pressurizing direction, i.e., the direction of the arrow V11, is set in a direction having an angle equal to or more than 3° and equal to or less than 10° with respect to the direction, i.e., the straight line Z, perpendicular to the rotational axis X of the pivot shaft (see FIG. 12) of the upper guide portion 60A pivoting between the open position and the close position. The inclined member 71*a* is thus provided.

In such a case, the upper guide portion 60A may move in a direction of an arrow V12 when the inclined member 71*a* pressurizes the upper guide portion 60A in the pivot direction, i.e., in the direction of the arrow V11, of the front door 120 through the jam releasing lever 61 by the force of closing the front door 120. Then, an edge of the upper guide portion 60A comes into contact with the regulating surface of the guide holding member 130 fixed to the frame 112 of the apparatus body 110A (see FIG. 3) from a direction of the arrow V12. Then, the widthwise force F1 applied to the upper guide portion 60A as the downstream holding releasing portion 71 of the front door 120 butts against the tip of the jam releasing lever 61 is separated into components in the width direction and the downward direction by the inclined surface of the inclined member 71*a* (resultant force f1). Then, the upper guide portion 60A held by the guide holding member 130 is released by the resultant force f1, and the upper guide portion 60A falls downward while frictionally sliding the jam releasing lever 61 with the inclined surface of the inclined member 71*a*. Therefore, the upper guide portion 60A may have rigidity necessary for the normal operation of the user.

As described above, according to the present exemplary embodiment, the upstream closing unit 50 and the downstream closing unit 70 are provided on the inner surface of the front door 120. The downstream closing unit 70 includes the downstream holding releasing portion 71 (51) (the same applies to the upstream closing unit 50) that butts against the jam releasing lever 61 (41) when the front door 120 is closed and releases the upper guide portion 60A (40A) held by the guide holding member 130. Still further, the downstream closing unit 70 (50) includes the downstream guide portion 72 (52) which is provided with the retraction member 72*a* (52*a*) pivotably. Along with the closing operation of the front door 120, the jam releasing lever 61 (41) butts against the retraction member 72*a* (52*a*). When the front door 120 is closed further as it is, the retraction member 72*a* (52*a*) is pressed by the jam releasing lever 61 (41) and retracts in the direction opposite from the direction in which the front door 120 is closed while sliding with the jam releasing lever 61 (41). This arrangement makes it possible to prevent the downstream conveyance unit 60 or the upstream conveyance unit 40 from being damaged even if the user closes the front door 120 while forgetting to close the upper guide portion 60A (40A).

Note that while the configuration in which the retraction member 52*a* is urged by the torsion spring 54 has been illustrated concerning the upstream conveyance unit 40 as illustrated in FIGS. 10A through 10D, the present disclosure is not limited to such configuration. For instance, an equal force f3 with the case where the torsion spring 54 is provided on the retraction member 52*a* may be applied by increasing a weight of the retraction member 52*a* or specifically a lower end side, without providing the torsion spring 54. Note that the same applies to the downstream conveyance unit 60.

Note that although the configuration in which the upstream guide holding member 130 is provided upstream in the sheet conveyance direction with respect to the upstream upper guide portion 40A and the guide holding member 130 is provided downstream of the sheet conveyance direction with respect to the downstream upper guide portion 60A, the present disclosure is not limited to such configuration. The positional relationship of the guide holding member 130 with the upper guide portion 40A (60A) may be opposite from the exemplary embodiment described above as long as such configuration is adopted that the angle θ formed by "the straight line Z which is a perpendicular line with respect to the rotational axis X of the upper guide portion 60A positioned at the open position and which passes through the butting point Q of the inclined surface of the inclined member 71*a* against which the jam releasing lever 61 butts" and "the straight line Y that passes through the butting point Q and the abutment point T of the guide holding member 130 with which the second guide plate 62 abuts" is equal to or more than 3° and equal to or less than 10°.

Note that the present disclosure may be applied not only to the external cooling apparatus 110 as described in the exemplary embodiment but also to the conveyance unit 170 (see FIG. 1) or the like for conveying the sheet S within the apparatus body 100A of the image forming apparatus 100 for example. Still further, the abovementioned embodiment is applicable also to a sheet conveyance apparatus capable of passing the sheet S with the sheet cooling unit 20 which is provided within the apparatus body 100A of the image forming apparatus 100. That is, the sheet conveyance apparatus of the present exemplary embodiment may be disposed at any place within the apparatus body 100A of the image forming apparatus 100 or within the apparatus body 110A of the external cooling apparatus 110.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-91179, filed on May 26, 2020, Japanese Patent Application No. 2020-91180, filed on May 26, 2020, and Japanese Patent Application No. 2021-39766, filed on Mar. 12, 2021, which are hereby incorporated by reference herein in their entirety.

What is claimed is:

1. A sheet conveyance apparatus comprising:

a conveyance portion configured to convey a sheet;

a first guide configured to guide the sheet conveyed by the conveyance portion;

a second guide provided so as to face the first guide and configured to form a sheet conveyance path together with the first guide, the sheet passing through the sheet conveyance path, the second guide being pivotable between a first position in which the sheet conveyance path is formed and a second position in which the sheet conveyance path is opened;

a holding portion configured to hold the second guide at the second position;

a cover configured to be movable between a closed position in which the cover covers the second guide and an open position in which the second guide is exposed to outside of the sheet conveyance apparatus;

a first abutting portion provided on the cover and configured to abut the second guide; and a second abutting portion provided on the cover and configured to abut the second guide at a position different from that of the first abutting portion, wherein the first abutting portion is disposed such that in a state where the second guide is held at the second position by the holding portion, when the cover is moved to the closed position from the open position, the first abutting portion abuts the second guide to release the second guide held by the holding portion, and wherein the second abutting portion is disposed such that in a state where the cover is positioned at the closed position, the second abutting portion abuts the second guide to position the second guide at the first position.

2. The sheet conveyance apparatus according to claim 1, wherein in a state releasing the second guide held by the holding portion, the second guide moves to the first position from the second position by a weight of the second guide.

3. The sheet conveyance apparatus according to claim 1, wherein the cover includes a regulating portion configured to regulate the second guide to the first position.

4. The sheet conveyance apparatus according to claim 1, wherein the second guide is pivotable about a pivot axis extending in a horizontal direction, and wherein the cover is arranged on an opposite side of the pivot axis across the sheet conveyance path.

5. The sheet conveyance apparatus according to claim 4, wherein the cover is pivotable about a pivot axis extending in a perpendicular direction.

6. The sheet conveyance apparatus according to claim 1, wherein the holding portion is a magnet and is configured to hold the second guide to the second position by a magnetic force of the magnet.

7. The sheet conveyance apparatus according to claim 1, wherein the conveyance portion is a cooling conveyance portion including a belt and a cooling portion configured to cool the sheet conveyed in contact with the belt, and wherein the first guide and the second guide are configured to guide the sheet cooled by the cooling conveyance portion.

8. The sheet conveyance apparatus according to claim 7, wherein the belt includes a conveying surface configured to be in contact with the sheet in a state where the sheet is conveyed, and wherein in a sheet conveyance direction, a distance of the conveying surface is longer than a distance of a guide surface of the second guide.

9. The sheet conveyance apparatus according to claim 1, wherein in a sheet conveyance direction, the first guide includes a first upstream guide member disposed upstream from the conveyance portion and a first downstream guide member disposed downstream from the conveyance portion, wherein the second guide includes a second upstream guide member disposed so as to face the first upstream guide member and a second downstream guide member disposed so as to face the first downstream guide member, wherein the first abutting portion includes an upstream abutting member abutting with the second upstream guide member and a downstream abutting member abutting with the second downstream guide member, wherein the upstream abutting member is disposed such that in a state where the second upstream guide member is held at the second position by the holding portion and the cover moves to the closed position from the open position, the upstream abutting member abuts the second upstream guide member to release the second upstream guide member held by the holding portion, and wherein the downstream abutting member is disposed such that in a state where the second downstream guide member is held at the second position by the holding portion and the cover moves to the closed position from the open position, the downstream abutting member abuts the second downstream guide member to release the second downstream guide member held by the holding portion.

10. The sheet conveyance apparatus according to claim 9, wherein in the state where the second downstream guide member is held at the second position by the holding portion and the cover moves to the closed position from the open position, the upstream abutting member is configured to release the second upstream guide member held by the holding portion by abutting the second upstream guide member, and wherein in the state where the second downstream guide member is held at the second position by the holding portion and the cover moves to the closed position from the open position, and in a state where the upstream abutting member has released the second upstream guide member held by the holding portion by abutting the second upstream guide member, the downstream abutting member is configured to release the second downstream guide member held by the holding portion by abutting the second downstream guide member.

11. The sheet conveyance apparatus according to claim 1, further comprising:

a manipulating portion provided on the second guide and configured to be manipulated for pivoting the second guide;

a pressing portion provided on the cover and configured to press the manipulating portion such that the second guide is positioned at the first position; and a retraction portion provided on the cover and configured to retract the pressing portion from a moving locus of the manipulating portion in moving the second guide from the first position to the second position by abutting with the manipulating portion of the second guide moving from the second position to the first position and swinging.

12. The sheet conveyance apparatus according to claim 11, further comprising:

a guide portion provided on the cover and configured to guide the second guide to the first position through the manipulating portion while suppressing a move of the second guide in a sheet conveyance direction of the conveyance portion in a state where the second guide is moved from the second position to the first position.

13. The sheet conveyance apparatus according to claim 12, wherein the guide portion includes an opening portion through which the manipulating portion of the second guide intrudes and is configured to guide the manipulating portion, moving downward in a perpendicular direction along with a move of the cover from the open position to the closed position, along the opening portion in the state where the second guide is moved from the second position to the first position; and wherein the retraction portion is provided within the guide portion and is exposed out of the opening portion.

14. The sheet conveyance apparatus according to claim 11, wherein the retraction portion has a center of pivot located higher than the pressing portion in a perpendicular direction and is integrally provided with the pressing portion pivotably by setting a side of the pressing portion as a free-end.

15. The sheet conveyance apparatus according to claim 11, wherein the retraction portion includes an urging portion configured to urge the cover in a direction of closing the cover.

16. The sheet conveyance apparatus according to claim 11, wherein the pressing portion includes an elastic member that elastically deforms by abutting against the manipulating portion and pressing the second guide toward the first guide through the manipulating portion.

17. The sheet conveyance apparatus according to claim 16, further comprising a guide holding magnet provided at least one of the first guide and the second guide, wherein the elastic member presses the manipulating portion such that the second guide is held at the first position by a magnetic force of the guide holding magnet.

18. The sheet conveyance apparatus according to claim 1, wherein the conveyance portion includes a first roller provided in the first guide and a second roller provided in the second guide and coming into contact with and pressing the first roller at the first position.

19. The sheet conveyance apparatus according to claim 1, wherein the first abutting portion is formed obliquely such that a lower side thereof is closer to an inner surface of the cover than an upper side thereof in a perpendicular direction, and wherein the second abutting portion is formed obliquely such that a lower side thereof is closer to the inner surface of the cover than an upper side thereof in the perpendicular direction.

20. The sheet conveyance apparatus according to claim 19, wherein the first abutting portion is formed obliquely such that a side thereof close to a pivot shaft of the cover is closer to the inner surface of the cover than a side thereof further from the pivot shaft.

21. The sheet conveyance apparatus according to claim 20, further comprising a regulating portion configured to abut with the second guide on a side of the pivot shaft of the cover in a sheet conveyance direction of the conveyance portion to regulate a move of the second guide to the side of the pivot shaft of the cover.

22. The sheet conveyance apparatus according to claim 21, further comprising a manipulating portion provided on the second guide and configured to be manipulated for pivoting the second guide, wherein an angle formed by a straight line which is a perpendicular line with respect a rotational axis of the second guide and which passes through an abutting point of the first abutting portion against which the manipulating portion abuts and a line that passes through the abutting point and an abutment point of the regulating portion with which the second guide abuts is equal to or more than 3° and equal to or less than 10°.

23. A sheet conveyance apparatus comprising:

a conveyance portion configured to convey a sheet;

a first guide configured to guide the sheet conveyed by the conveyance portion;

a second guide provided so as to face the first guide and configured to form a sheet conveyance path together with the first guide, the sheet passing through the sheet conveyance path, the second guide being pivotable between a first position in which the sheet conveyance path is formed and a second position in which the sheet conveyance path is opened;

a holding portion configured to hold the second guide at the second position; and a cover configured to be movable between a closed position in which the cover covers the second guide and an open position in which the second guide is exposed to outside of the sheet conveyance apparatus, wherein the cover is disposed such that in a state where the second guide is held at the second position by the holding portion, when the cover is moved to the closed position from the open position, the cover releases the second guide held by the holding portion.

* * * * *